(12) United States Patent
Lucas et al.

(10) Patent No.: US 11,492,422 B2
(45) Date of Patent: Nov. 8, 2022

(54) OLEFIN POLYMERIZATION PROCESSES

(71) Applicant: ExxonMobil Chemical Patents Inc., Baytown, TX (US)

(72) Inventors: Michael D. Lucas, Houston, TX (US); Handel D. Bennett, Houston, TX (US); David T. Lakin, Houston, TX (US); Aaron C. McGinnis, Houston, TX (US); Benjamin J. Ohran, Humble, TX (US); David J. Sandell, Sparks, NV (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 18 days.

(21) Appl. No.: 16/952,991

(22) Filed: Nov. 19, 2020

(65) Prior Publication Data

US 2021/0079126 A1    Mar. 18, 2021

(51) Int. Cl.
| | |
|---|---|
| *C08F 2/34* | (2006.01) |
| *C08F 2/01* | (2006.01) |
| *C08F 210/16* | (2006.01) |
| *C08F 210/06* | (2006.01) |
| *C08F 210/02* | (2006.01) |

(52) U.S. Cl.
CPC .................. *C08F 2/34* (2013.01); *C08F 2/01* (2013.01); *C08F 210/02* (2013.01); *C08F 210/06* (2013.01); *C08F 210/16* (2013.01)

(58) Field of Classification Search
USPC .................................... 526/88, 901; 422/145
See application file for complete search history.

(56) References Cited

U.S. PATENT DOCUMENTS

| | | | |
|---|---|---|---|
| 4,003,712 A | 1/1977 | Miller | |
| 4,011,382 A | 3/1977 | Levine et al. | |
| 4,086,408 A | 4/1978 | Karol et al. | |
| 4,303,771 A | 12/1981 | Wagner et al. | |
| 4,349,648 A | 9/1982 | Jorgensen et al. | |
| 4,543,399 A | 9/1985 | Jenkins, III | |

(Continued)

FOREIGN PATENT DOCUMENTS

EP    0571826 A    2/1997

OTHER PUBLICATIONS

Anonymous, (2013) "Analog-to-Digital Conversion for Continuous Control via Optimal Scheduling of an Optional Step in a Discrete Cyclical Process", IP.com Article-000227758D, May 14, 2013, 8 pages.

*Primary Examiner* — Fred M Teskin
(74) *Attorney, Agent, or Firm* — ExxonMobil Chemical Patents Inc.—Law Department

(57) ABSTRACT

A process for producing an olefin polymer employs a gas phase polymerization reactor having a product discharge system comprising first and second pairs of lock hoppers, wherein each pair comprises an upstream lock hopper connected by valve means to the reactor and a downstream lock hopper connected by valve means to the upstream lock hopper and by further valve means to a product recovery system, and wherein a first cross-tie is provided between the upstream lock hoppers of the first and second pairs of lock hoppers and a second cross-tie is provided between the downstream lock hoppers of the first and second pairs of lock hoppers. Operation of the second cross-tie during product removal cycles is controlled in accordance with reactor pressure.

13 Claims, 19 Drawing Sheets

(56) References Cited

U.S. PATENT DOCUMENTS

| | | | |
|---|---|---|---|
| 4,621,952 A | 11/1986 | Aronson | |
| 5,306,792 A | 4/1994 | Havas et al. | |
| 5,352,749 A | 10/1994 | DeChellis et al. | |
| 6,063,877 A | 5/2000 | Kocian et al. | |
| 6,255,411 B1 | 7/2001 | Hartley et al. | |
| 7,807,761 B2 * | 10/2010 | Chamayou | C08F 10/00 422/135 |
| 8,293,853 B2 | 10/2012 | Parrish et al. | |
| 9,328,177 B2 | 5/2016 | Moebus et al. | |
| 9,410,001 B2 | 8/2016 | Cai et al. | |
| 11,192,970 B2 | 12/2021 | Pannel | |
| 2005/0137364 A1 | 6/2005 | Cai et al. | |
| 2016/0108147 A1 * | 4/2016 | Penzo | B01J 8/1863 422/134 |

\* cited by examiner

OLEFIN POLYMERIZATION PROCESSES

FIELD

This application relates to olefin polymerization processes and particularly to gas phase olefin polymerization processes.

BACKGROUND

Gas phase catalytic polymerization of olefins is the predominant technology used to produce polyolefin resins. The catalysts used in the process are contained in solid substrate particles from which the polymer chains grow. Gas phase olefin polymerization technology often employs a fluidized bed, where the particles are fluidized by a gas stream also containing the reactants, such as the olefin monomer or monomers. The carrier gas for the catalyst particles is normally an inert gas, especially nitrogen. Processes of this type are described in, for example, EP-A-0 475 603, EP-A-0 089 691 and EP-A-0 571 826, which are hereby incorporated by reference.

In many gas phase polymerization processes, the polymer particles produced in the fluidized bed are discharged discontinuously from the reactor and conveyed pneumatically, generally using nitrogen, to a product recovery system. The product recovery system typically includes one or more pairs of series connected lock hoppers to control gas loss from the reactor during discharge of the polymer. An early example of such a product recovery system using a single pair of lock hoppers in disclosed in, for example, U.S. Pat. No. 4,621,952. More recent configurations employ two pairs of lock hoppers in which a valved connection is provided between the corresponding lock hopper in each pair as an optional step to reduce gas loss by minimizing the pressure of the discharging pair of lock hoppers. There are two such valved connections, one of which connects the upstream and hence higher pressure lock hoppers and is referred to herein as the W cross-tie, while the other connects the downstream and lower pressure lock hoppers and is referred to herein as the X cross-tie. An example of such a product recovery system is disclosed in U.S. Pat. No. 6,255,411.

Pressure control is a vital factor in any gas phase olefin polymerization system and is dominated by the need to remove nitrogen. This can be achieved by direct venting of nitrogen from the reactor but, without separation facilities to recover the hydrocarbons entrained in the vent gas, doing so is not economically attractive and poses environmental problems. In addition, hydrocarbon recovery is difficult and expensive and so it is important to minimize the removal of nitrogen by direct reactor venting.

Further references of potential interest in this general regard include U.S. Pat. Nos. 4,003,712, 4,011,382, 4,086, 408, 4,303,771, 4,349,648, 5,352,749, 6,063,877, 8,293,853, and 9,328,177; as well as U.S. Patent Application Publication No. 2005/0137364A1, and PCT Patent Application Publication Nos. 2014/074981 and 2018/063765 U.S. Pat. No. 8,293,853.

Improving pressure control while reducing the costs and hydrocarbon losses inherent in direct nitrogen venting remains a strong driver of polymerization research and development.

SUMMARY

According to the present application, computer modelling has shown that the use of the X cross-tie decreases the net nitrogen reduction from the reactor during a product discharge cycle, since not only does it reduce loss of carrier gas from the reactor but it also forces more nitrogen from the conveying gas used by the product discharge system back into the reactor. Thus optimizing the use of the X cross-tie by means of a controller responsive to reactor pressure provides an effective mechanism for nitrogen reduction without direct reactor venting. For example, if the reactor pressure is high, the controller can schedule a plurality of discharge cycles without use of the X cross-tie, resulting in each cycle removing more reactor nitrogen. This reduction in nitrogen from the product discharge system due to the decreased X cross-tie use hastens the desired pressure change in the reactor thereby enabling direct reactor venting to be avoided.

Thus, in one aspect, the present application resides in a process for producing an olefin polymer, the process comprising:

(a) providing a gas phase polymerization reactor having a product discharge system comprising first and second pairs of lock hoppers, wherein each pair comprises an upstream lock hopper connected by valve means to the reactor and a downstream lock hopper connected by valve means to the upstream lock hopper and by further valve means to a product recovery system, and wherein a first cross-tie is provided between the upstream lock hoppers of the first and second pairs of lock hoppers and a second cross-tie is provided between the downstream lock hoppers of the first and second pairs of lock hoppers;

(b) supplying a particulate catalyst and a carrier gas to the polymerization reactor such that the particulate catalyst is maintained in a fluidized state by the carrier gas;

(c) supplying at least one olefin monomer to the fluidized catalyst in the reactor under conditions effective to polymerize the monomer and produce a polymer product;

(d) removing the polymer product and a reactor gas comprising at least a portion of the carrier gas from the reactor through the first and second pairs of lock hoppers in cycles, wherein each removal cycle (d) includes the steps of:
  (i) transferring polymer product and reactor gas from the reactor to the upstream lock hopper of the first pair of lock hoppers and equilibrating the pressure between the reactor and said upstream lock hopper;
  (ii) while performing (i), transferring polymer product and reactor gas from the upstream to the downstream lock hopper of the second pair of lock hoppers and equilibrating the pressure therebetween;
  (iii) while performing (i) and (ii), transferring polymer product using a conveying gas from the downstream lock hopper of the first pair of lock hoppers to the product recovery system;
  (iv) after performing (i), (ii), and (iii), passing reactor gas from the upstream lock hopper of the first pair of lock hoppers to the upstream lock hopper of the second pair of lock hoppers via the first cross-tie to equilibrate the pressure between the upstream lock hoppers; and further wherein some, but not all, of the removal cycles
  (d) further include the step of:
  (v) passing reactor gas and conveying gas from the downstream lock hopper of the first pair of lock hoppers to the downstream lock hopper of the second pair of lock hoppers via the second cross-tie to equilibrate the pressure between the downstream lock hoppers;

further wherein during steps (i), (ii), (iii), (iv), and (v) each lock hopper is isolated by closed valves from any of the reactor, the other lock hoppers and the product recovery system not necessary for the performance of the respective step;

(e) sensing the pressure in the reactor; and (f) adjusting the frequency of step (v) during successive removal cycles in accordance with the reactor pressure sensed in (e).

DETAILED DESCRIPTION OF THE EMBODIMENTS

Figure 1:
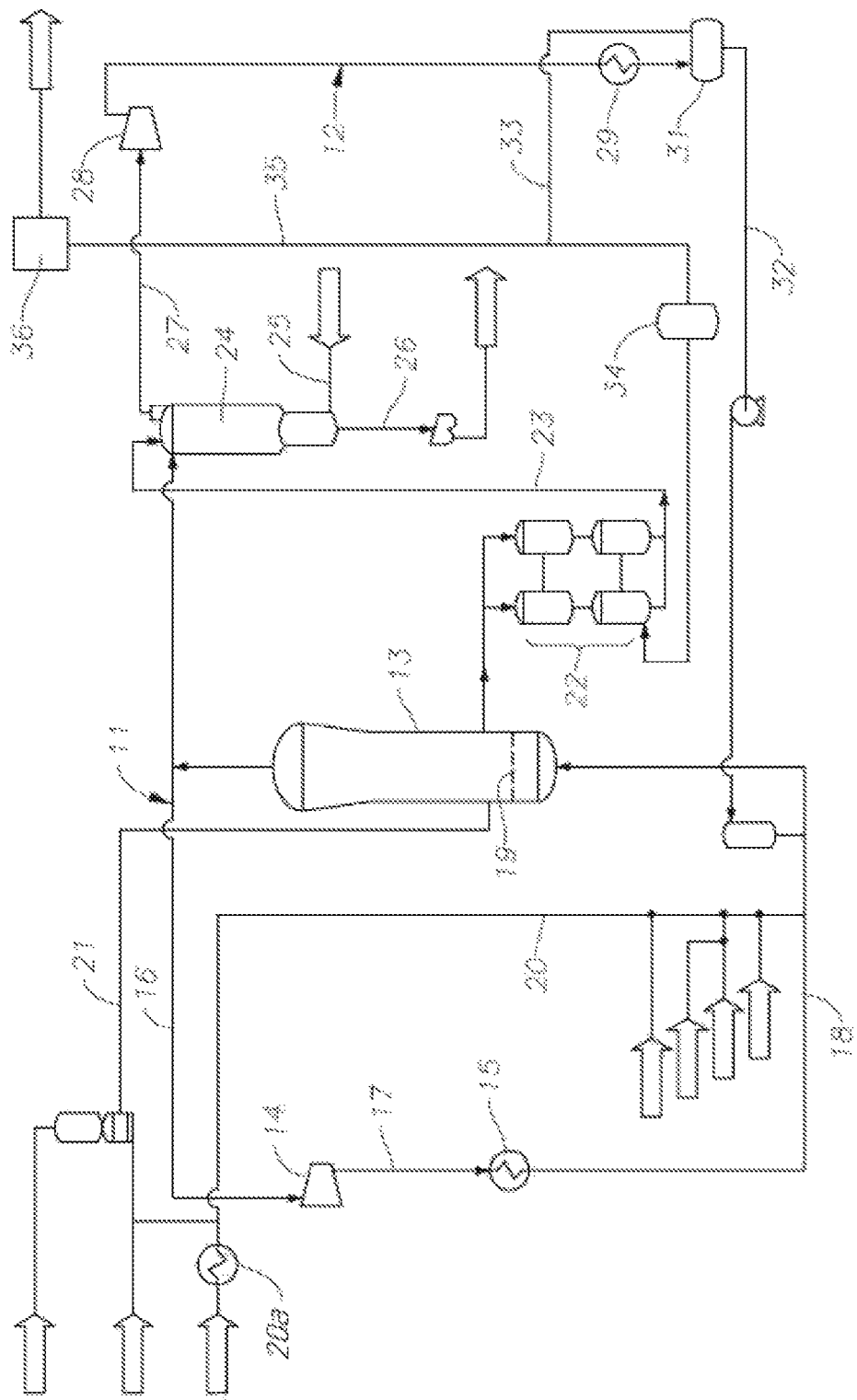
FIG. 1 is a simplified flow diagram of a gas phase ethylene polymerization process according to one embodiment of the present disclosure.

Referring to FIG. 1, the gas phase ethylene polymerization process shown includes a polymer production loop 11 and a polymer recovery loop 12. Connected in series within the polymer production loop 11 are a fluidized bed reactor 13, a cycle gas compressor 14 and a cycle gas cooler 15. The outlet from the reactor 13 is connected by line 16 to the low pressure side of the compressor 14, whose high pressure side is connected via line 17 to the high temperature side of the cooler 15. The low temperature side of the cooler 15 is connected via line 18 to the inlet of the reactor 13.

Fresh ethylene from a pipeline or storage, optionally after heating by a heat exchanger, is supplied by line 20 to be mixed with cooled recycled ethylene in line 18 before being introduced into the reactor 13, generally near the bottom of the reactor above the distributor plate 19. Also supplied to the reactor 13 via lines 20 and 18 may be one or more $C_3$ to $C_6$ alkanes to assist in heat removal and hydrogen to control the degree of polymerization. One or more comonomers, such as propylene and/or $C_4$ to $C_8$ alpha-olefins, may also be supplied to the reactor 13 via line 20. A carrier gas for the polymerization catalyst and for fluidizing the growing polymer particles in the reactor is mixed with fresh catalyst from storage and supplied to the reactor 13 via line 21. The reactor 13 is operated under conditions to maintain the monomer(s) in the gas phase and effective to polymerize the monomer(s) to produce an ethylene homopolymer or copolymer. Typical conditions include a temperature of 70 to 110° C. and a pressure of 15 to 30 bar (1500 to 3000 kPa-a), such as 17 to 26 bar (1700 to 2600 kPa-a).

Particulate polymer product is removed intermittently from the reactor 13 typically from a region just above the distributor plate and passed to a product discharge system indicated generally at 22 in FIG. 1 and discussed in detail with reference to FIGS. 2 to 19. Product withdrawal is usually initiated when the product inventory in the reactor exceeds a desired value. The inventory in the reactor is generally determined by either the bed level or weight measurements, or from secondary measurements used to infer bed level or bed weight. Upon detection of a high reactor inventory, the product discharge system is initiated to pass the polymer product to the product discharge system 22, as further explained below.

The polymer product as it leaves the reactor 13 is saturated with unreacted monomer as well as other hydrocarbons added to, or produced in, the polymerization process. The polymer product is discharged from the reactor along with reactor gas. "Reactor gas" as used herein refers to the gas that leaves the reactor, and typically is a mixture comprising ethylene (e.g., unreacted ethylene gas leaving the reactor) and at least a portion of the inert carrier gas used to fluidize the catalyst and transport it into the reactor in the first place. The inert carrier gas is preferably nitrogen, though it can be any inert gas that would not react or otherwise alter the polymerization reaction. Carrier gases for gas phase fluidized bed polymerization reactors are well known in the art, and their identity is not the focus of the present disclosure. The reactor gas may further comprise hydrogen (used, e.g., as a chain transfer agent in polymerization) as well as reaction and other process byproducts such as water, ammonia, methane, higher alkanes, carbon dioxide, and/or other compounds of oxygen, carbon, and/or hydrogen. To recover hydrocarbons entrained in with the polymer product and initiate purification of the product, the particulate polymer collected by the product discharge system 22 is transferred by a conveying gas, such as nitrogen or a mixture of nitrogen and ethylene, via line 23 to a monomer stripping vessel 24 in the polymer recovery loop 12. The polymer product enters the top of the vessel 24 and, as it flows downwardly through the vessel 24, is contacted with fresh and recycled stripping gas supplied to the bottom of the vessel via line 25. The countercurrent contact between the polymer product and the stripping gas flushes out reactor gas entrained in the polymer product and strips and desorbs hydrocarbons, including unreacted monomer, dissolved in the polymer product powder. The stripping gas may be a gas inert to the polymerization process, such as nitrogen.

The stripped polymer product exits the bottom of the vessel 24 and is fed via line 26 and is fed to a finishing section (not shown), whereas the hydrocarbon-containing stripping gas effluent exits the top of the vessel 24 and is fed via line 27 to the low pressure side of a recovery compressor 28. The high pressure side of the compressor 28 is connected to a condenser 29 where some of the hydrocarbons contained in the compressed stripping gas effluent are cooled and condensed. The condensed liquid is then recovered in a condensed liquids drum 31 before being recycled to the polymer production loop 11 via line 32.

The gaseous component of the stripping gas effluent remaining after passage through the condenser 29 is fed by line 33 to a split where a portion is removed and, after passage through a surge tank 34, is recycled to line 23 to assist in conveying the polymer product from the reactor 13 to the stripping vessel 24. The remainder of the stripping gas effluent in line 33 is fed by line 35 to a membrane separation system 36 where entrained hydrocarbons are removed from the effluent before the remainder of the effluent is fed to a flare (not shown).

Figure 2:
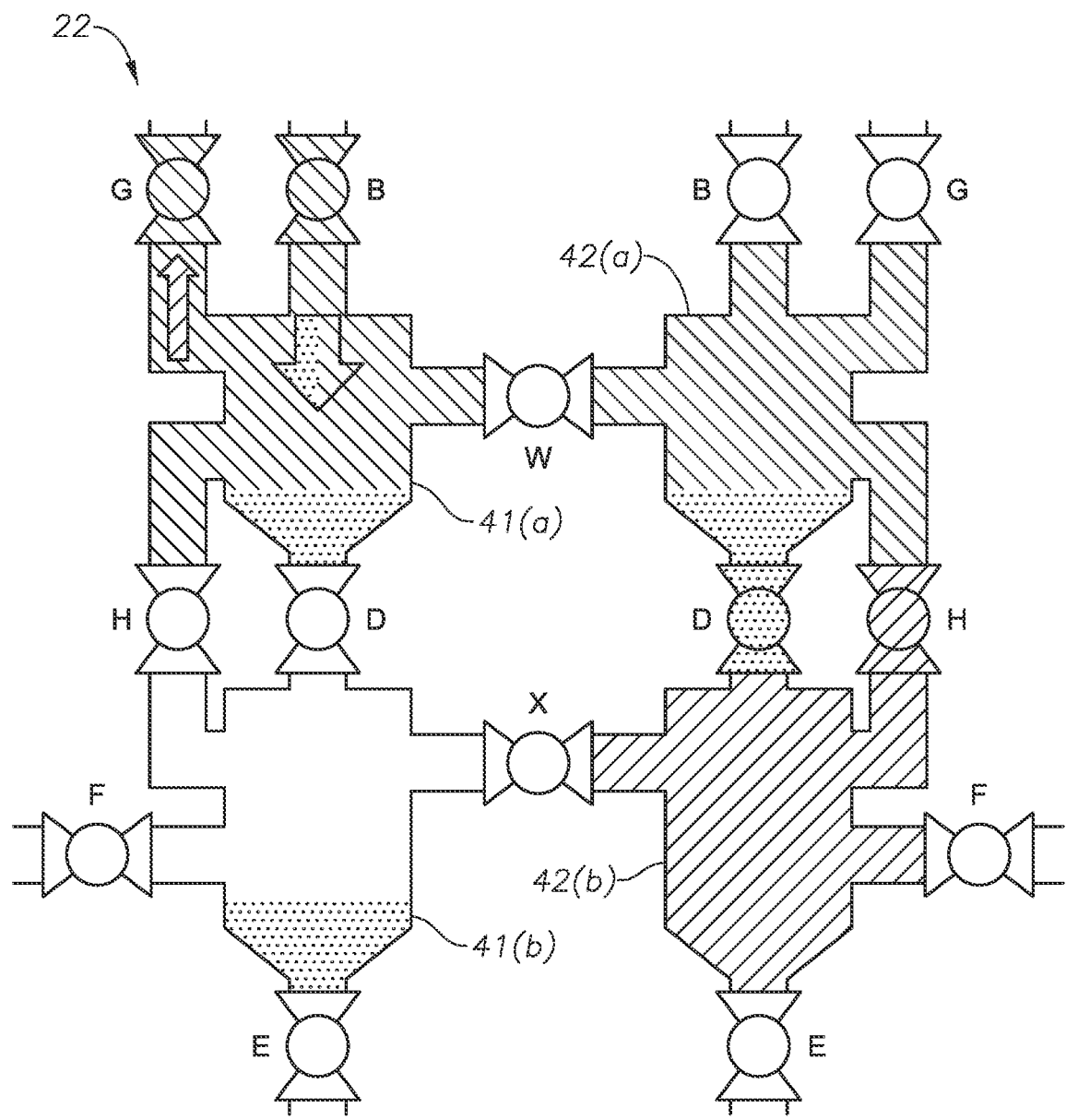
FIG. 2 is a schematic representation of a product delivery system for use in the process of FIG. 1.

Referring now to FIG. 2, the product discharge system 22 comprises a first pair of lock hoppers 41(a) and 41(b) and a second pair of lock hoppers 42(a) and 42(b) connected in parallel between the reactor 13 and the line 23. Each pair of lock hoppers comprises an upstream lock hopper 41(a), 42(a) connected by valve means B and G to the reactor and a downstream lock hopper 41(b), 42(b) connected by valve means D and H to the upstream lock hopper and by further valve means E to the line 23 and the product recovery loop 12. Each downstream lock hopper 41(b), 42(b) is connected by a valve F to a source of conveying gas to facilitate transfer of polymer product from the downstream lock hopper 41(b), 42(b) to the line 23. In addition, a first valved connection W, also referred to as the W cross-tie, is provided between the upstream lock hoppers 41(a) and 42(a) and a second valved connection X, also referred to as the X cross-tie, is provided between the downstream lock hoppers 41(b) and 42(b).

Since the monomer stripping vessel 24 operates at a lower pressure, often a significantly lower pressure, than the reactor 13, the construction and operation of the product discharge system 22 is designed not only to provide efficient removal of the solid polymer product but also to allow reduction in effluent pressure without excessive loss of the reactor contents. Thus, to initiate a product discharge cycle, one of the valves B is opened, for example that connecting the reactor with the upstream lock hopper 41(a), with the other valves connected to the hopper 41(a) being closed to isolate it from the remainder of the product discharge system 22. When the valve B is opened, polymer product and reactor gas flow into the lock hopper 41(a) (as illustrated by the arrow in FIG. 2) and, as the lock hopper 41(a) contents pressure approaches that of the reactor, the associated valve G is opened to allow the gas in the lock hopper 41(a) to be displaced into the reactor and thereby facilitate complete filling of lock hopper 41(a) with fresh reactor contents. When lock hopper 41(a) is full, valves B and G are closed and the valve D connecting lock hoppers 41(a) and 41(b) is opened to allow the contents of lock hopper 41(a) to be transferred to lock hopper 41(b). Again, during this operation, the hopper 41(b) is isolated from the remainder of the product discharge system 22 (e.g., with valves X, E, F, and H remaining closed), at least until the hopper 41(b) pressure equilibrates with 41(a), at which time valve H is also opened to allow the gas in lock hoppers 41(b) to be displaced into 41(a) by the falling polyethylene from 41(a). When substantially all of the polyethylene (e.g., preferably 90 to 99.9%, such as 95 to 99.9%) from 41(a) has fallen into lock hopper 41(b), valves D and H are closed and valves E and F are opened to allow the conveying gas to transport the polymer product from the lock hopper 41(b) to the stripping vessel 24 (shown in FIG. 1). The whole operation is similarly carried out for lock hoppers 42(a) and 42(b).

In general terms, the removal of the polymer product from the reactor through the product discharge system 22 is effected in sequential cycles, wherein each cycle includes the steps of:

(i) transferring polymer product and reactor gas from the reactor 13 to the upstream lock hopper 41(a) of the first pair of lock hoppers 41 and equilibrating the pressure between the reactor and said upstream lock hopper;

(ii) while performing (i), transferring polymer product and reactor gas from the upstream lock hopper 42(a) to the downstream lock hopper 42(b) of the second pair of lock hoppers 42 and equilibrating the pressure therebetween;

(iii) while performing (i) and (ii), transferring polymer product using a conveying gas from the downstream lock hopper 41(b) of the first pair of lock hoppers 41 to the product recovery loop 12 (of FIG. 1);

(iv) after performing (i), (ii), and (iii), passing carrier (or reactor) gas from the upstream lock hopper 41(a) of the first pair of lock hoppers 41 to the upstream lock hopper 42(a) of the second pair of lock hoppers 42 via the first cross-tie W to equilibrate the pressure between the upstream lock hoppers; and (v) optionally passing reactor gas and conveying gas from the downstream lock hopper 41(b) of the first pair of lock hoppers 41 to the downstream lock hopper 42(b) of the second pair of lock hoppers 42 via the second cross-tie X to equilibrate the pressure between the downstream lock hoppers, wherein during steps (i), (ii), (iii), (iv), and (v) each lock hopper is isolated by closed valves from any of the reactor, the other lock hoppers and the product recovery loop not necessary for the performance of the respective step.

A preferred sequence of operations of the product discharge system 22 in transferring polymer product from the reactor 13 to the product recovery loop 12 is illustrated in FIGS. 3 to 19, in which the return valves G are omitted for simplicity. In addition, valves associated with the first pair of lock hoppers 41 may be referred to as "first" valves, for example, first valve B, while valves associated with the second pair of lock hoppers 42 may be referred to as "second" valves, for example, second valve B. To estimate the flows of material during the discharge operations, FIGS. 3 to 19 show polymer product (or polymer powder), reactor gas, and conveying gas illustrated as discrete units (e.g., circles depicting a unit of each type of gas; and larger circles depicting the polymer powder). Valves are shown as open with unfilled circles; and closed with filled or solid circles (for example, in FIG. 3, first valve B is open; second valve B is closed; valves W and X are closed, etc.). In general, the operations illustrated in FIGS. 3-19 and the accompanying description below are provided in a very simplified abstraction for explanatory purposes. In addition, the following assumptions are made in these drawings and the ensuing description:

When a quantity of polymer product is discharged from the reactor into one of the upstream lock hoppers, that lock hopper loses all its previous contents to the reactor and receives one polymer product large unit, and 36 reactor gas units.

When a quantity of polymer product leaves the system, the associated downstream lock hopper loses all of its contents and receives 36 conveying gas units.

When W or X opens, the sending hopper sends half of its gas units to the receiving hopper. If the sending side would have to send a fractional unit, it instead keeps the whole number unit rather than splitting, for purposes of this illustrative discussion.

When D and H valves open, the associated upstream and downstream lock hoppers become well mixed and half of the well mixed gas units end up on each side (e.g., upstream and downstream of the valves). If there were a case in which a fractional unit would be made, the sending side always keeps the whole number unit for purposes of this illustrative discussion.

Figure 3:
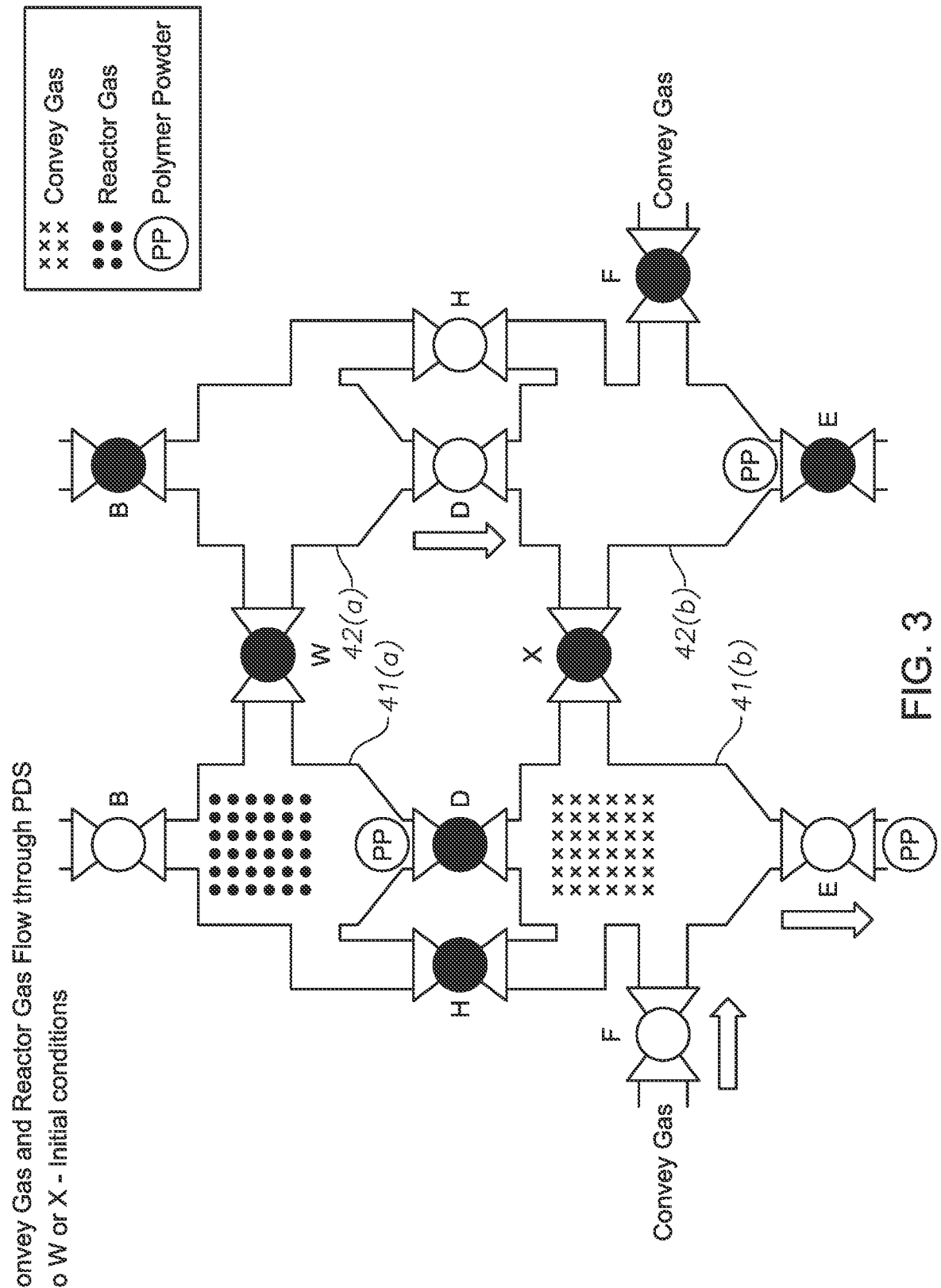
FIGS. 3 to 19 are simplified schematic representations of the product delivery system of FIG. 2 at different consecutive stages of system operation.

FIG. 3 shows an initial position of the product discharge system 22 in which the following conditions apply (shorthand for conditions: "neither W nor X"):

first valve B (and first valve G not shown) is open and lock hopper 41(a) contains one polymer product unit and 36 reactor gas units;

first valves E and F are open so that a charge of polymer product previously-delivered to the lock hopper 41(b) is transported by the conveying gas to the product recovery loop 12 and the contents of the lock hopper 41(b) are replaced with 36 conveying gas units;

second valves D and H are open so that a charge of polymer product previously-delivered to the lock hopper 42(a) passes to the lock hopper 42(b); and the W and X cross-ties are closed.

The quantity of conveying gas and reactor gas may be initialized to zero on the second pair of lock hoppers. (e.g., 42(a) and 42(b)). The final values will converge after a few steps.

Figure 4:
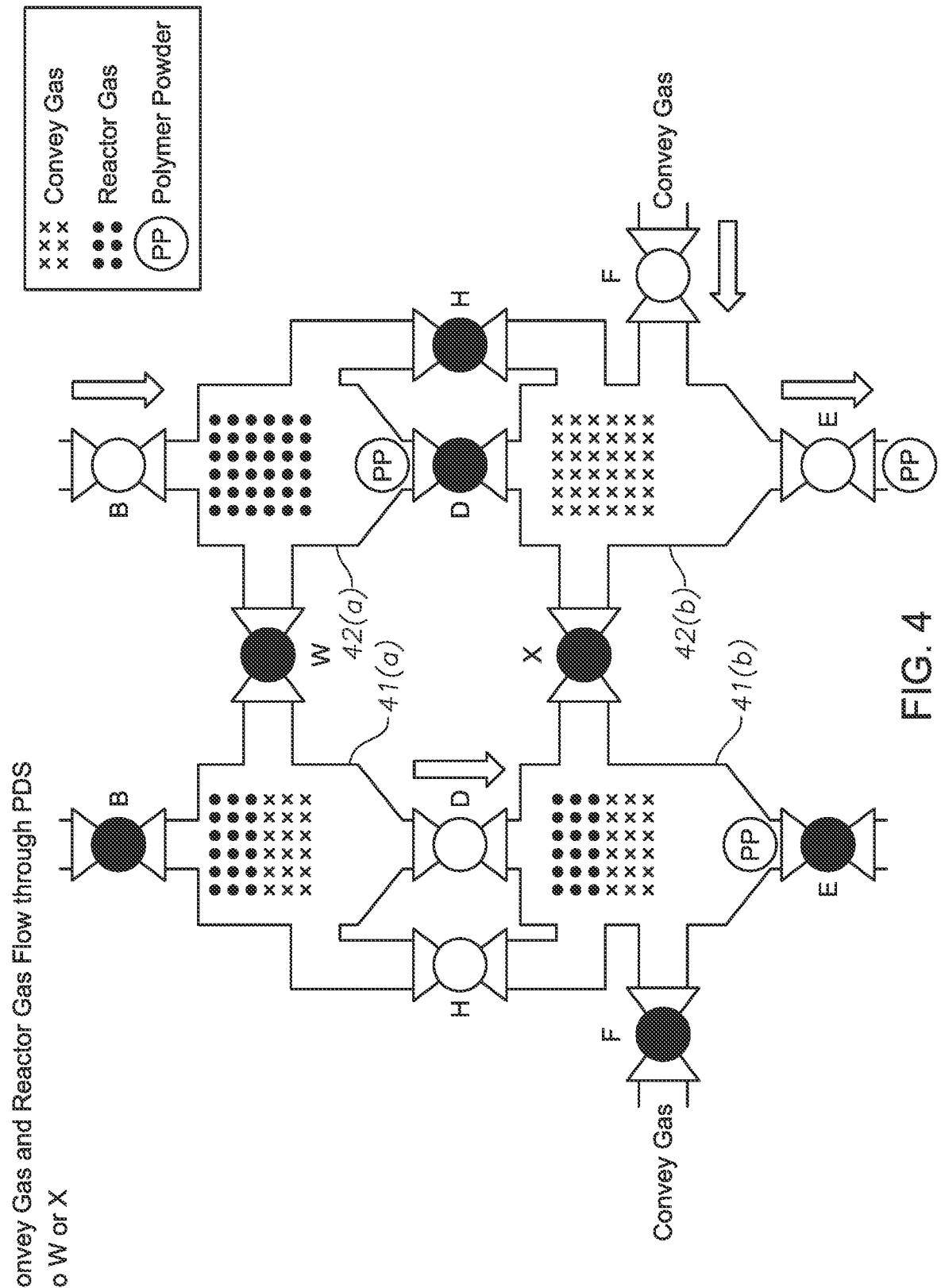

FIG. 4 shows the configuration of the product discharge system 22 at the next stage of operation after the initial position shown in FIG. 3, in which the positions of the various valves and the material flows are as follows:

first valves B, G, E and F are now closed and first valves D and H are open so that the charge of polymer product in the lock hopper 41(a) passes to the lock hopper 41(b) and each of the lock hoppers 41(a), 41(b) contains 18 units of reactor gas and 18 units of conveying gas;

second valve B (and second valve G not shown) is open and one polymer product unit and 36 reactor gas units flow from the reactor to the lock hopper 42(a);

second valves D and H are now closed and second valves E and F are open so that the charge of polymer product just delivered to the lock hopper 42(b) is transported by the conveying gas to the product recovery loop 12 and the contents of the lock hopper 42(b) are replaced with 36 conveying gas small units; and the W and X cross-ties remain closed.

Figure 5:
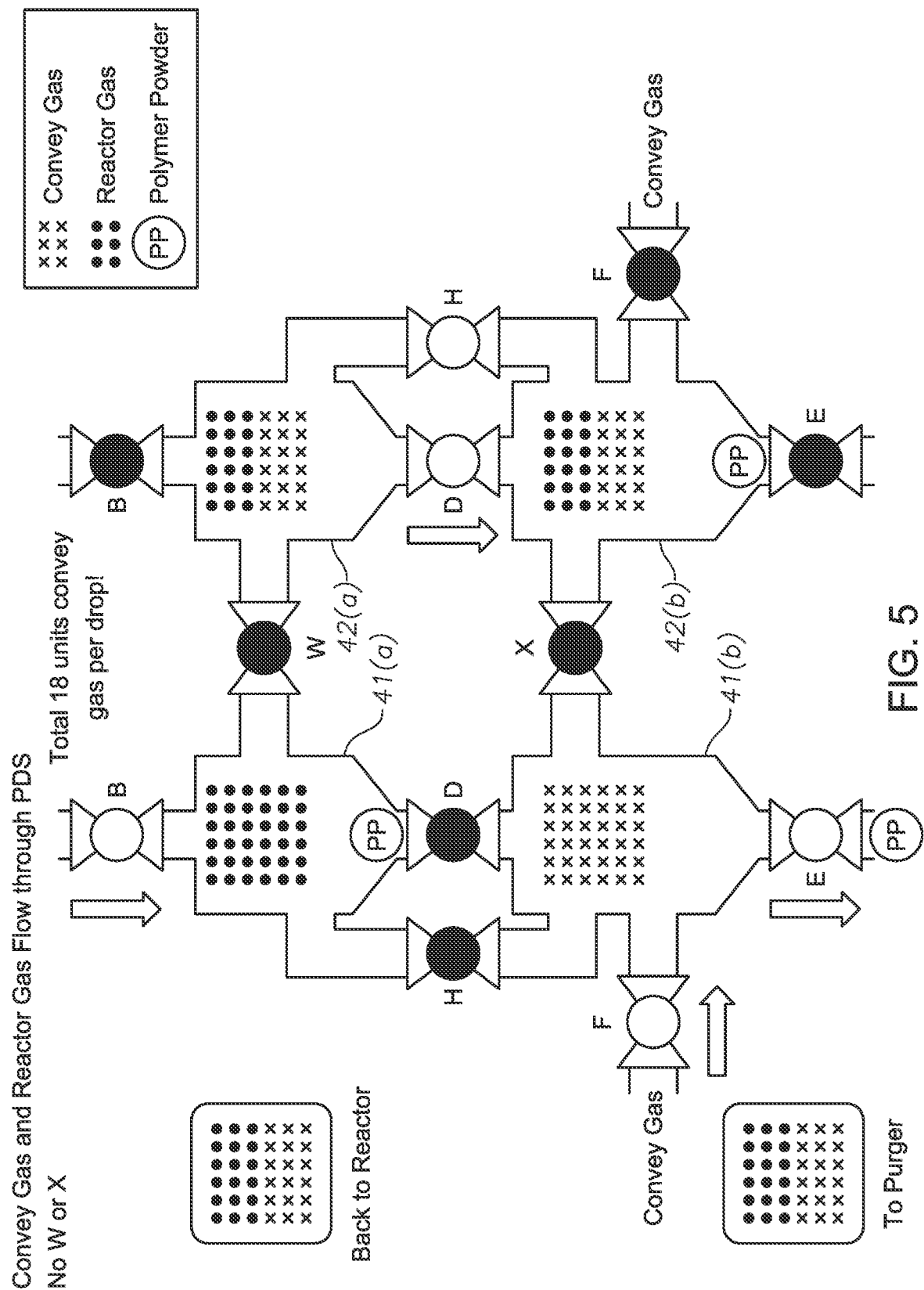

FIG. 5 shows the configuration of the product discharge system 22 at the next stage of operation after the position shown in FIG. 4, in which the positions of the various valves and the material flows are as follows:

first valves B and G are again open and lock hopper 41(a) contains one polymer product unit and 36 reactor gas units, the previous contents of the lock hopper 41(a), namely 18 units of reactor gas and 18 units of conveying gas having been transferred to the reactor through first valve G (not shown; although units transferred to reactor are shown to the side);

first valves D and H are now closed and first valves E and F are open so that the charge of polymer product just delivered to the lock hopper 41(b), together with 18 units of reactor gas and 18 units of conveying gas, are transferred to the product recovery loop 12 and the contents of the lock hopper 41(b) are replaced with 36 units of conveying gas;

second valves D and H are reopened and second valves E and F are closed so that the charge of polymer product just delivered to the lock hopper 42(a) flows to the lock hopper 42(b) and each of the lock hoppers 42(a), 42(b) contains 18 units of reactor gas and 18 units of conveying gas; and the W and X cross-ties remain closed.

Figure 6:
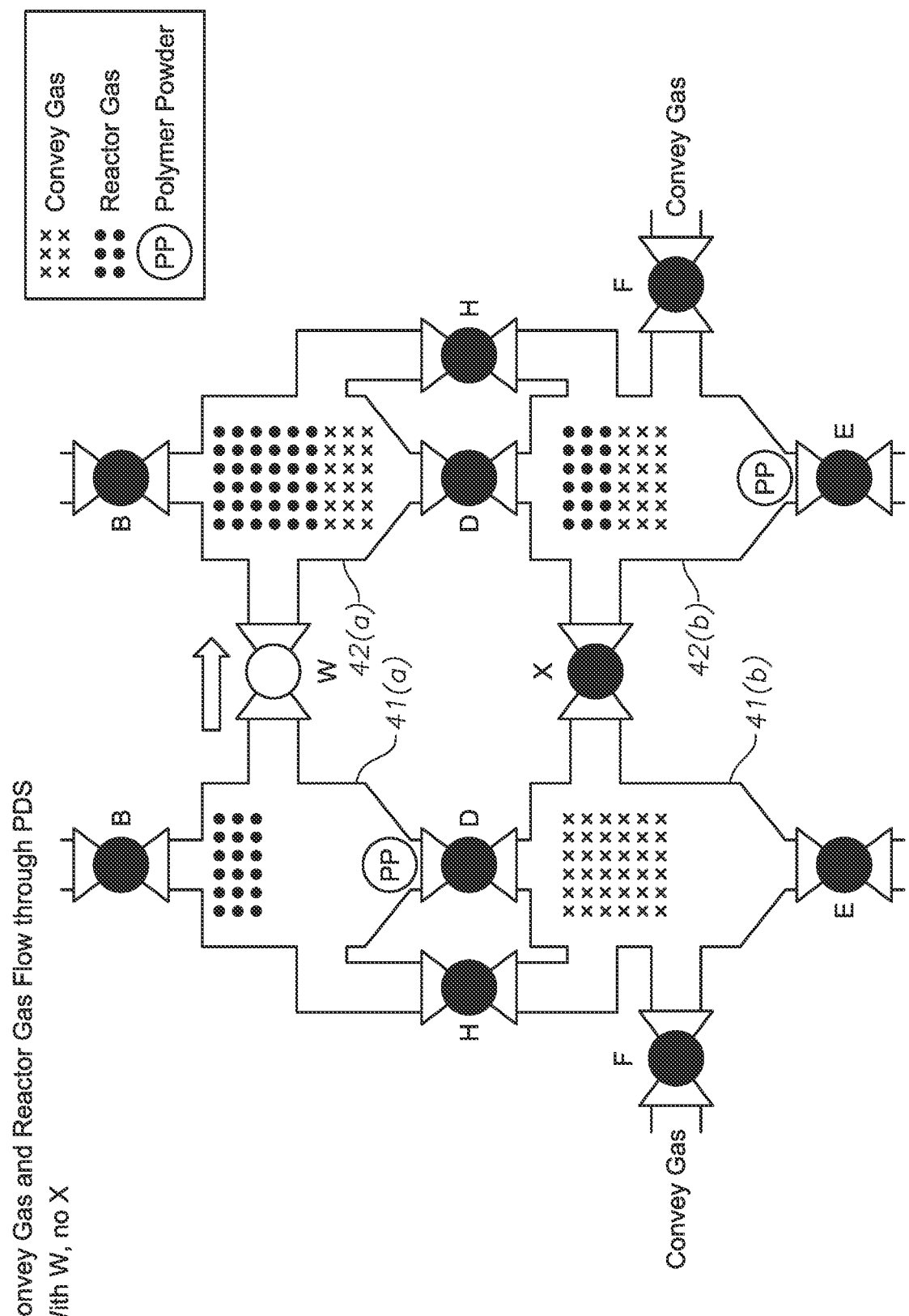

FIG. 6 shows the configuration of the product discharge system 22 at the next stage of operation after the position shown in FIG. 5, in which the cross-tie W is now opened while all the remaining valves (including the cross-tie X) are closed (shorthand for conditions: "with W, no X"). As result, since the lock hopper 41(a) is at this stage at a higher pressure than the lock hopper 42(a), half of the gaseous contents of the lock hopper 41(a) are transferred via cross-tie W to lock hopper 42(a) to equilibrate the pressures. The lock hopper 41(a) then contains 18 units of reactor gas and lock hopper 42(a) contains 36 units of reactor gas and 18 units of conveying gas.

Figure 7:
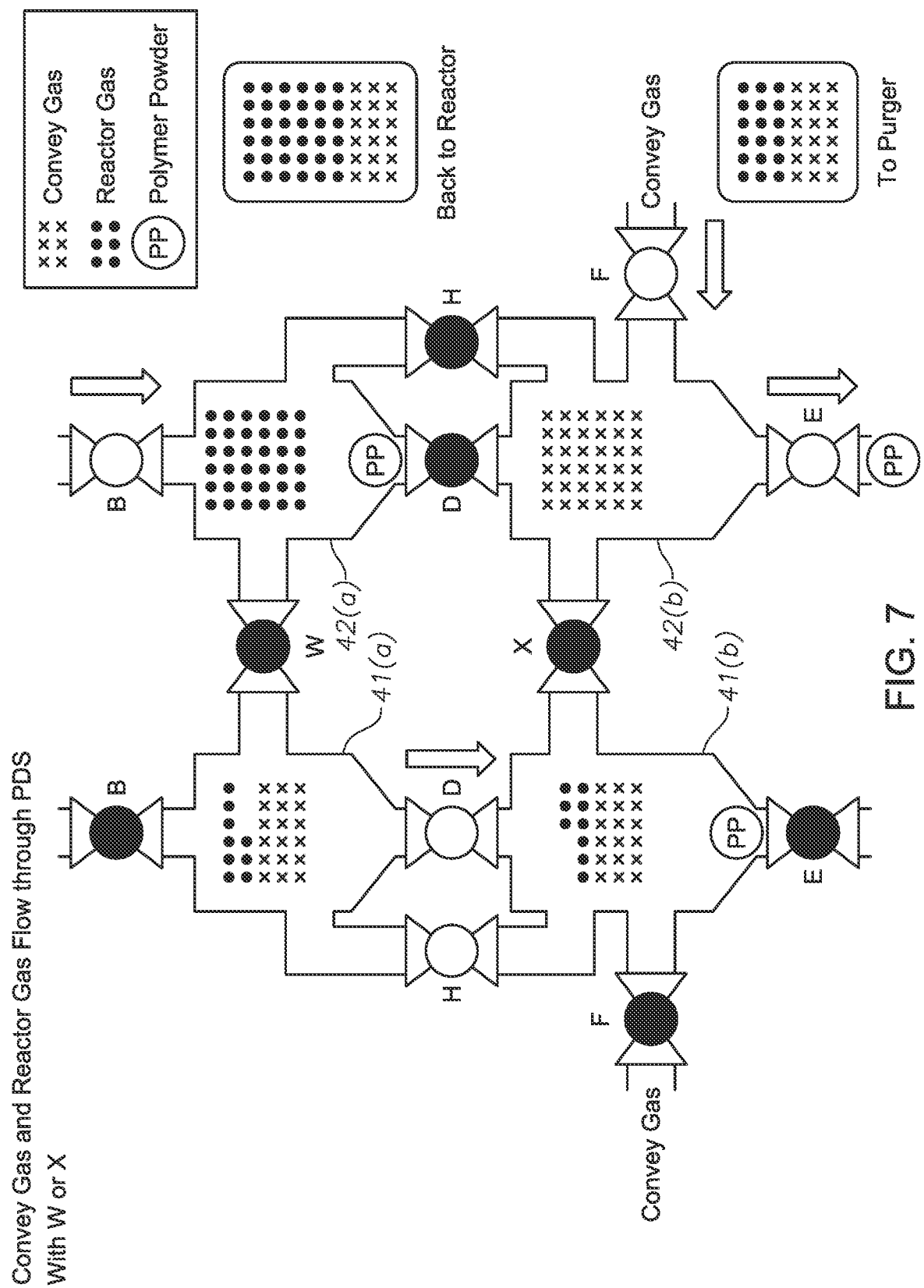

FIG. 7 shows the configuration of the product discharge system 22 at the next stage of operation after the position shown in FIG. 6, in which the positions of the various valves and the material flows are as follows:

first valves B, G, E and F remain now closed and first valves D and H are open so that the charge of polymer product in the lock hopper 41(a) passes to the lock hopper 41(b) and the gaseous contents of the lock hoppers 41(a), 41(b) are shared so that each contains 9 units of reactor gas and 18 units of conveying gas;

second valve B (and second valve G not shown) is open and a charge of polymer product and 36 units of reactor gas flow from the reactor into the lock hopper 42(a), the previous contents of the lock hopper 42(a), namely 36 units of reactor gas and 18 units of conveying gas having been transferred to the reactor through valve G;

second valves D and H remain closed and second valves E and F are open so that the charge of polymer product previously delivered to the lock hopper 42(b), together with 18 units of reactor gas and 18 units of conveying gas, are transferred to the product recovery loop 12 and the contents of the lock hopper 42(b) are replaced with 36 units of conveying gas;

the W and X cross-ties are closed.

Figure 8:
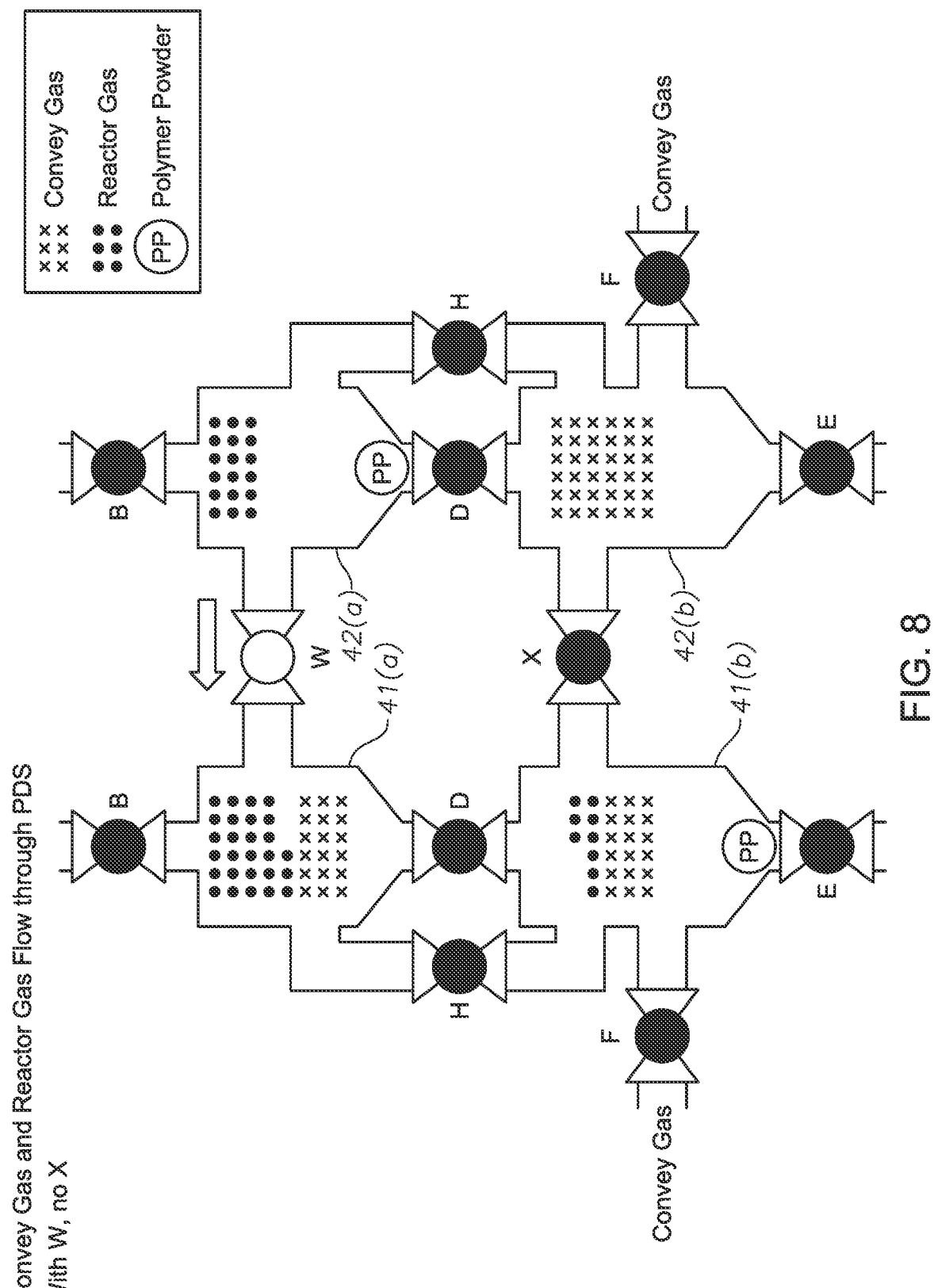

FIG. 8 shows the configuration of the product discharge system 22 at the next stage of operation after the position shown in FIG. 7, in which the cross-tie W is again opened while all the remaining valves (including the cross-tie X) are closed. As result, since the lock hopper 42(a) is now at a higher pressure than the lock hopper 41(a), half of the gaseous contents of the lock hopper 42(a) are transferred via cross-tie W to lock hopper 41(a) to equilibrate the pressures. The lock hopper 41(a) then contains 27 units of reactor gas and lock hopper 42(a) contains 18 units of reactor gas.

Figure 9:
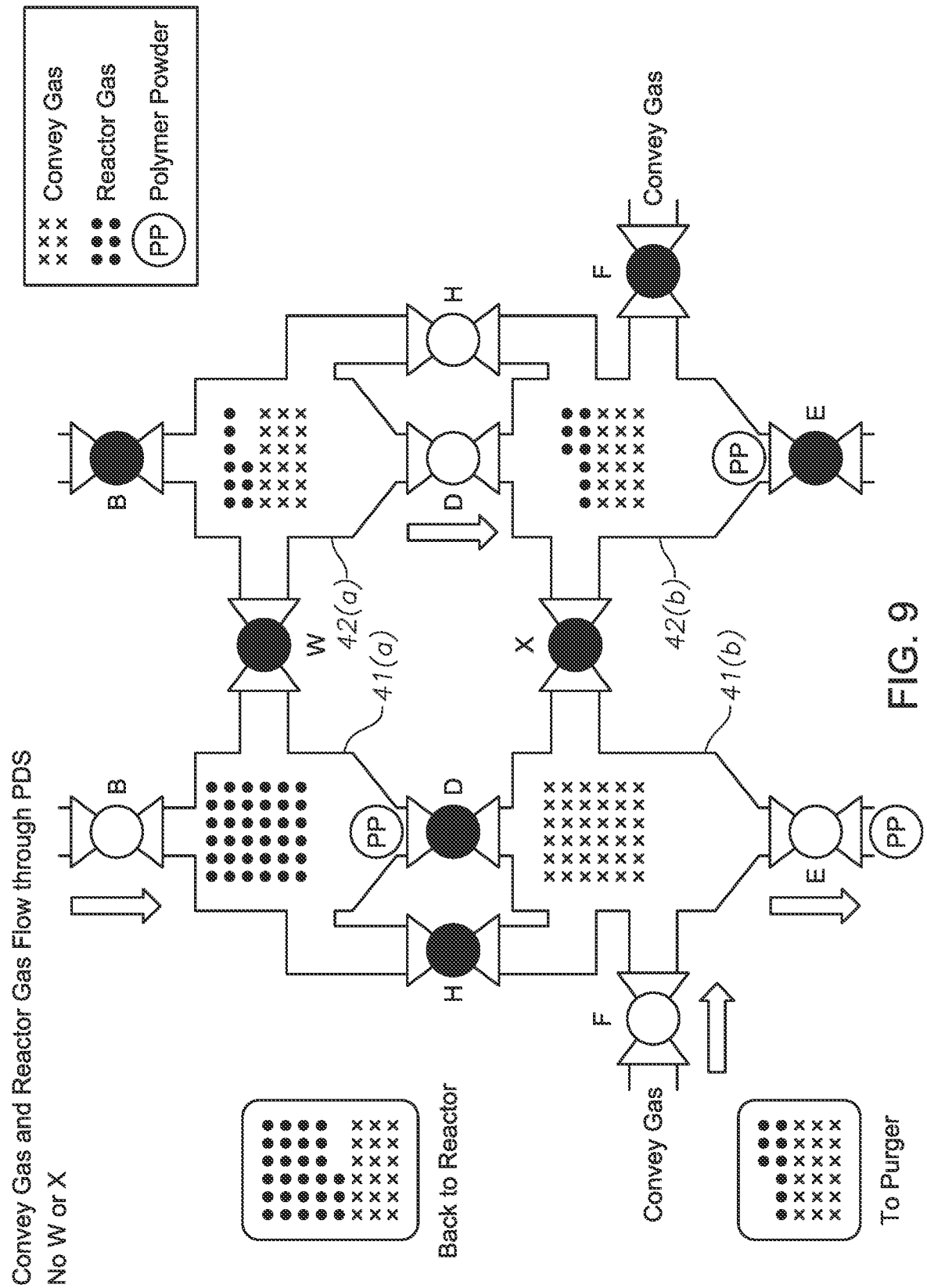

FIG. 9 shows the configuration of the product discharge system 22 at the next stage of operation after the position shown in FIG. 8, in which the positions of the various valves and the material flows are as follows:

first valve B (and first valve G not shown) is again open and lock hopper 41(a) contains a further charge of polymer product and 36 units reactor gas, the previous contents of the lock hopper 41(a), namely 27 units of reactor gas and 18 units of conveying gas having been transferred to the reactor through valve G;

first valves E and F are open so that a charge of polymer product previously-delivered to the lock hopper 41(b), together with 9 units of reactor gas and 18 units of conveying gas, are transported by the conveying gas to the product recovery loop 12 and the contents of the lock hopper 41(b) are replaced with 36 units of conveying gas;

second valves D and H are open so that a charge of polymer product previously delivered to the lock hopper 42(a) passes to the lock hopper 42(b) and the gaseous contents of the lock hoppers 42(a), 42(b) are shared so that each contains 9 units of reactor gas and 18 units of conveying gas; and the W and X cross-ties are closed.

Figure 10:
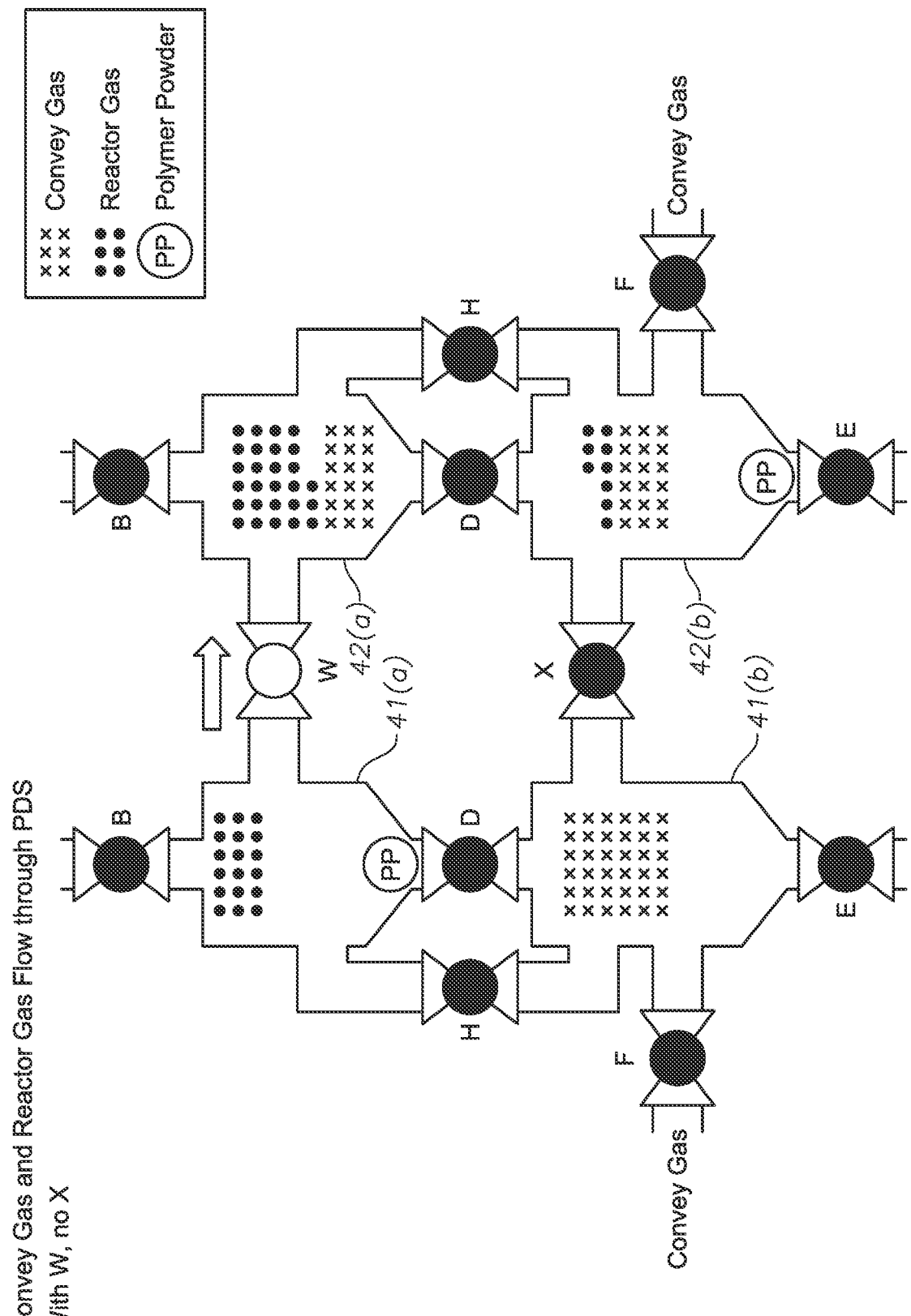

FIG. 10 shows the configuration of the product discharge system 22 at the next stage of operation after the position shown in FIG. 9, in which the cross-tie W is again opened while all the remaining valves (including the cross-tie X) are closed. As result, since the lock hopper 41(a) is now at a higher pressure than the lock hopper 42(a), half of the gaseous contents of the lock hopper 41(a) are transferred via cross-tie W to lock hopper 42(a) to equilibrate the pressures. The lock hopper 41(a) then contains 18 units of reactor gas and lock hopper 42(a) contains 27 units of reactor gas and 18 units of conveying gas.

Figure 11:
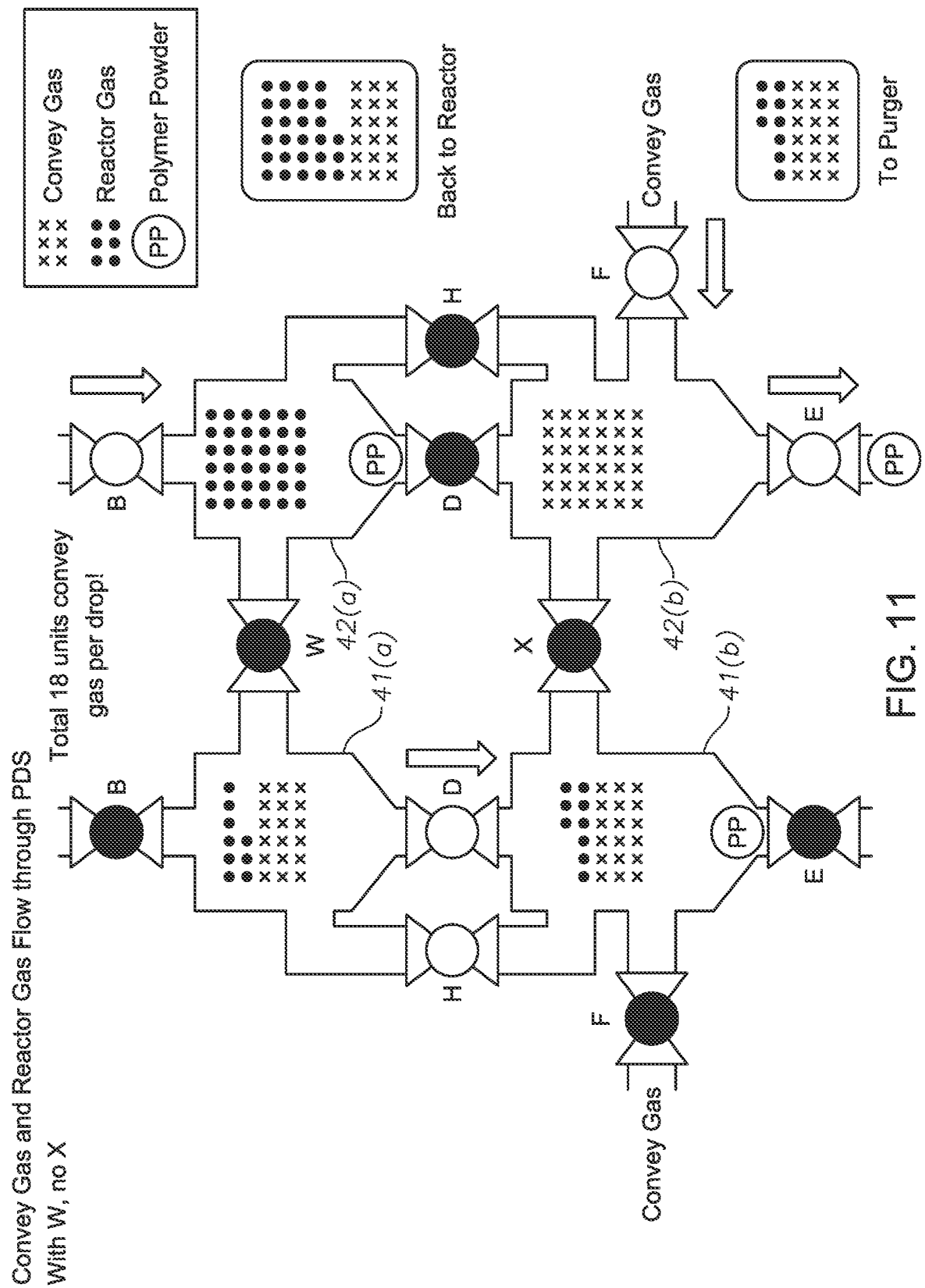

FIG. 11 shows the configuration of the product discharge system 22 at the next stage of operation after the position shown in FIG. 10, in which the positions of the various valves and the material flows are as follows:

first valves B, G, E and F remain closed and first valves D and H are open so that the charge of polymer product in the lock hopper 41(a) passes to the lock hopper 41(b) and the gaseous contents of the lock hoppers 41(a), 41(b) are shared so that each contains 9 units of reactor gas and 18 units of conveying gas;

second valve B (and second valve G not shown) is open and a charge of polymer product and 36 units of reactor gas flow from the reactor into the lock hopper 42(a), the previous contents of the lock hopper 42(a), namely 27 units of reactor gas and 18 units of conveying gas having been transferred to the reactor through valve G;

second valves D and H remain closed and second valves E and F are open so that the charge of polymer product previously delivered to the lock hopper 42(b), together with 9 units of reactor gas and 18 units of conveying gas, are transferred to the product recovery loop 12 and the contents of the lock hopper 42(b) are replaced with 36 units of conveying gas;

the W and X cross-ties are closed.

Figure 12:
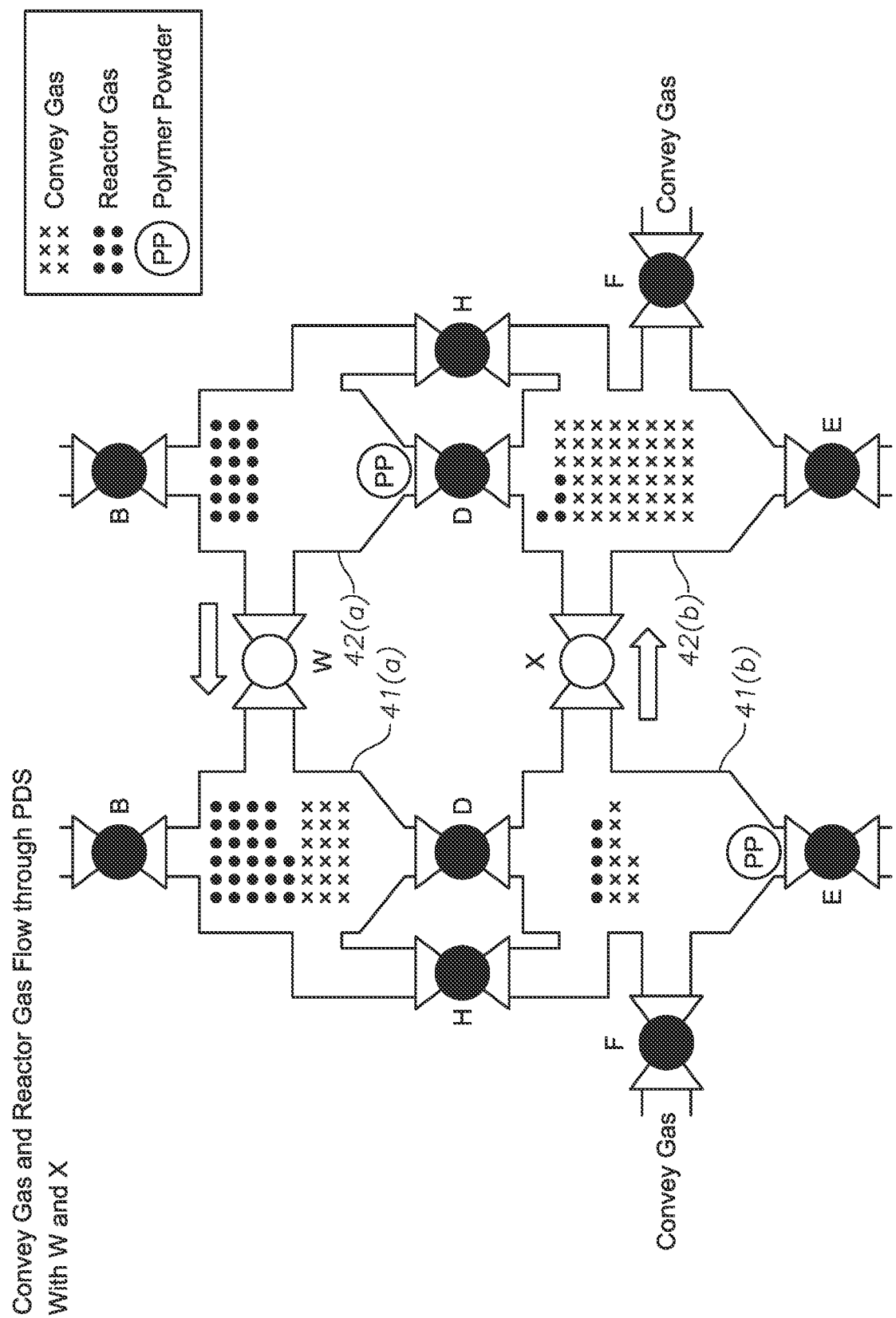

FIG. 12 shows the configuration of the product discharge system 22 at the next stage of operation after the position shown in FIG. 11, in which both cross-ties W and X are opened while all the remaining valves are closed (shorthand for condition: "with both W and X"). As a result, since the lock hopper 42(a) is at a higher pressure than the lock hopper 41(a), half of the gaseous contents of the lock hopper 42(a) are transferred via cross-tie W to lock hopper 41(a) to equilibrate the pressures. The lock hopper 41(a) then contains 27 units of reactor gas and 18 units of conveying gas, while lock hopper 42(a) contains 18 units of reactor gas. Similarly, since the lock hopper 41(b) is at a higher pressure than the lock hopper 42(b), half of the gaseous contents of the lock hopper 41(b) are transferred via cross-tie X to lock hopper 42(b) to equilibrate the pressures. The lock hopper 41(b) then contains 5 units of reactor gas and 9 units of conveying gas, while lock hopper 42(b) contains 4 units of reactor gas and 45 units of conveying gas.

Figure 13:
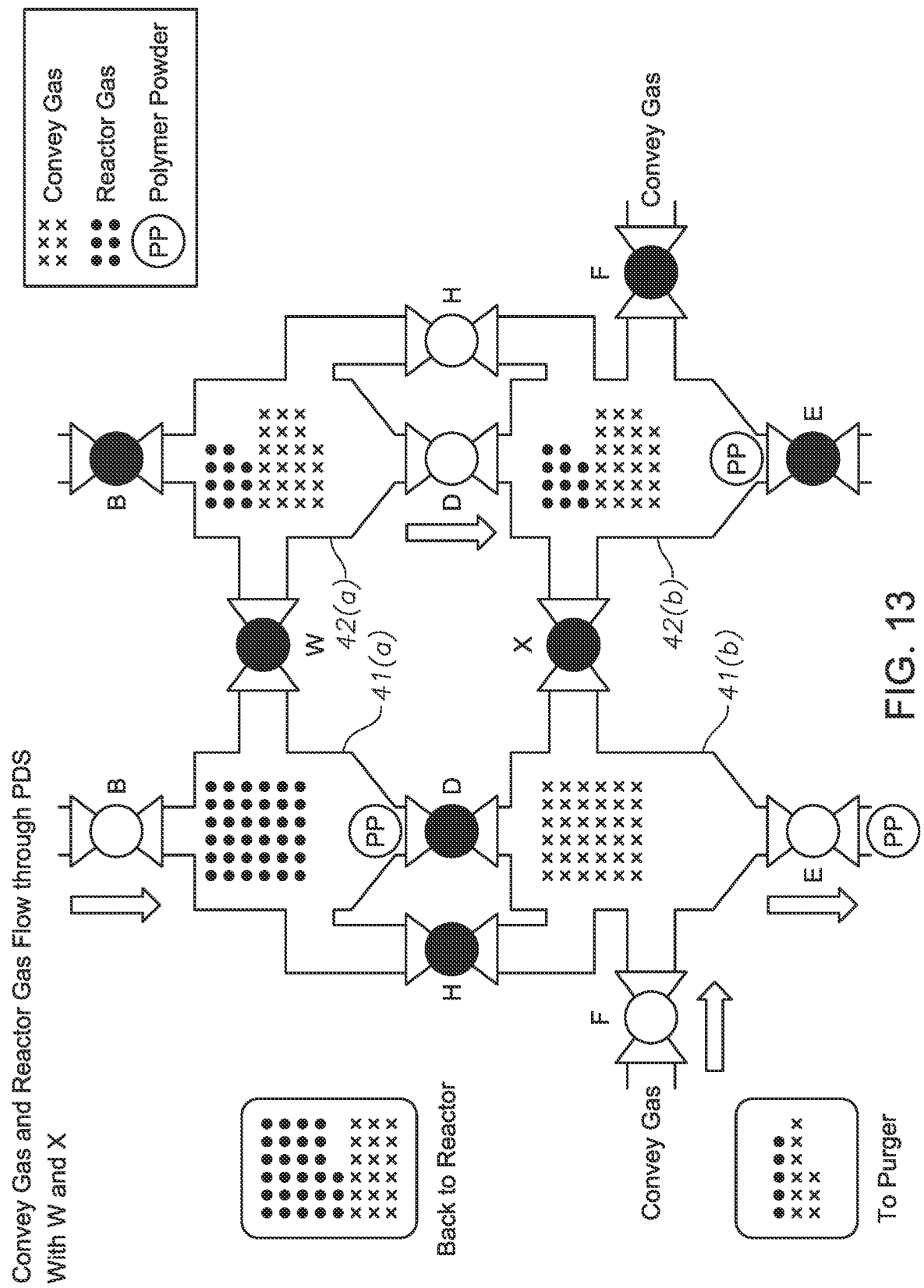

FIG. 13 shows the configuration of the product discharge system 22 at the next stage of operation after the position shown in FIG. 12, in which the positions of the various valves and the material flows are as follows:

first valve B (and first valve G not shown) is again open and lock hopper 41(a) contains a further charge of polymer product and 36 units reactor gas, the previous contents of the lock hopper 41(a), namely 27 units of reactor gas and 18 units of conveying gas, having been transferred to the reactor through valve G;

first valves E and F are open so that a charge of polymer product previously-delivered to the lock hopper 41(b), together with 5 units of reactor gas and 9 units of conveying gas, are transported by the conveying gas to the product recovery loop 12 and the contents of the lock hopper 41(b) are replaced with 36 units of conveying gas;

second valves D and H are open so that a charge of polymer product previously delivered to the lock hopper 42(a) passes to the lock hopper 42(b) and the gaseous contents of the lock hoppers 42(a), 42(b) are shared so that each contains 11 units of reactor gas and 22/23 units of conveying gas; and the W and X cross-ties are closed.

Figure 14:
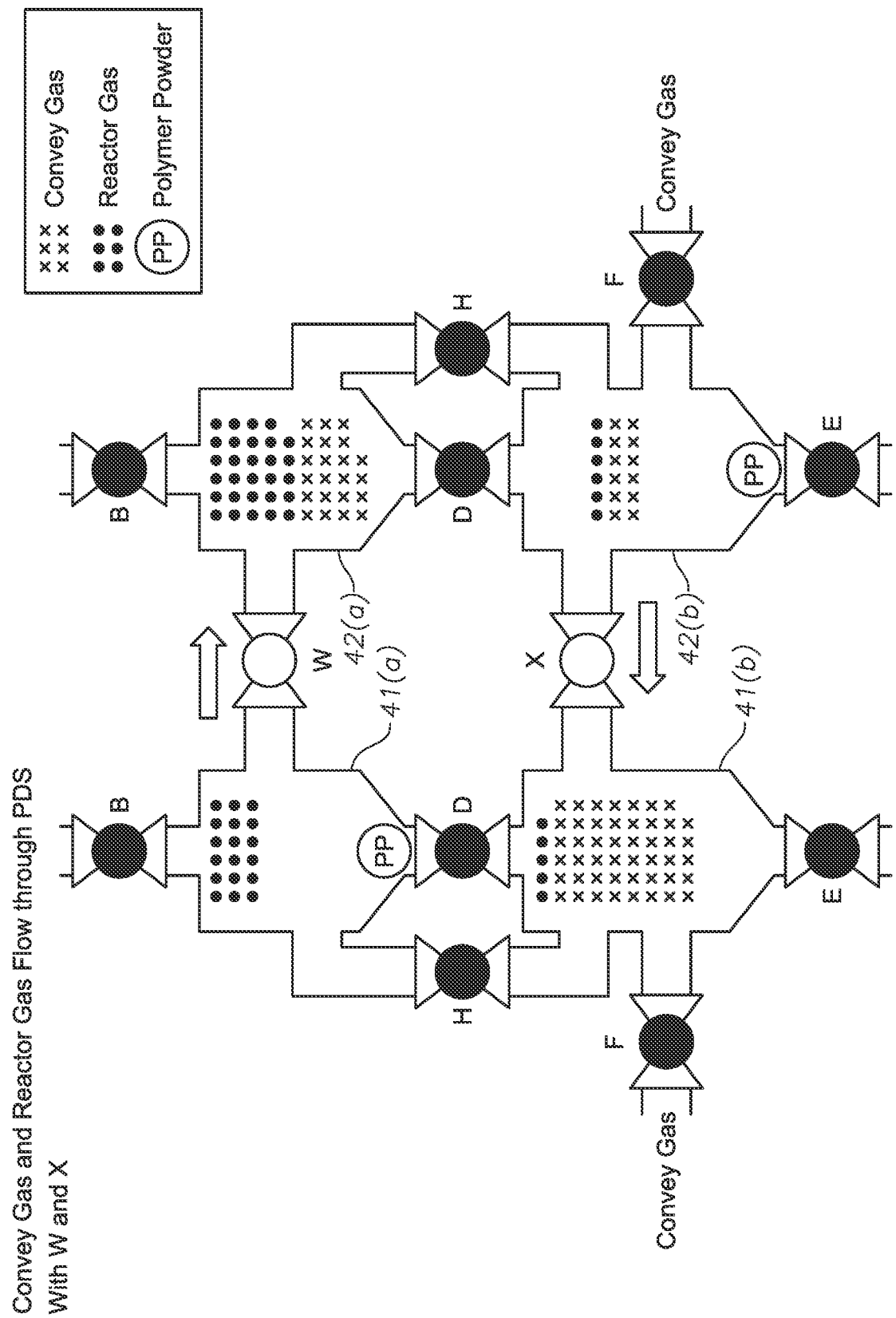

FIG. 14 shows the configuration of the product discharge system 22 at the next stage of operation after the position shown in FIG. 13, in which both cross-ties W and X are again opened while all the remaining valves are closed. As result, since the lock hopper 41(a) is at a higher pressure than the lock hopper 42(a), half of the gaseous contents of the lock hopper 41(a) are transferred via cross-tie W to lock hopper 42(a) to equilibrate the pressures. The lock hopper 41(a) then contains 18 units of reactor, while lock hopper 42(a) contains 29 units of reactor gas and 22 units of conveying gas. Similarly, since the lock hopper 42(b) is at a higher pressure than the lock hopper 41(b), half of the gaseous contents of the lock hopper 42(b) are transferred via cross-tie X to lock hopper 41(b) to equilibrate the pressures. The lock hopper 41(b) then contains 5 units of reactor gas and 47 units of conveying gas, while lock hopper 42(b) contains 6 units of reactor gas and 12 units of conveying gas.

Figure 15:
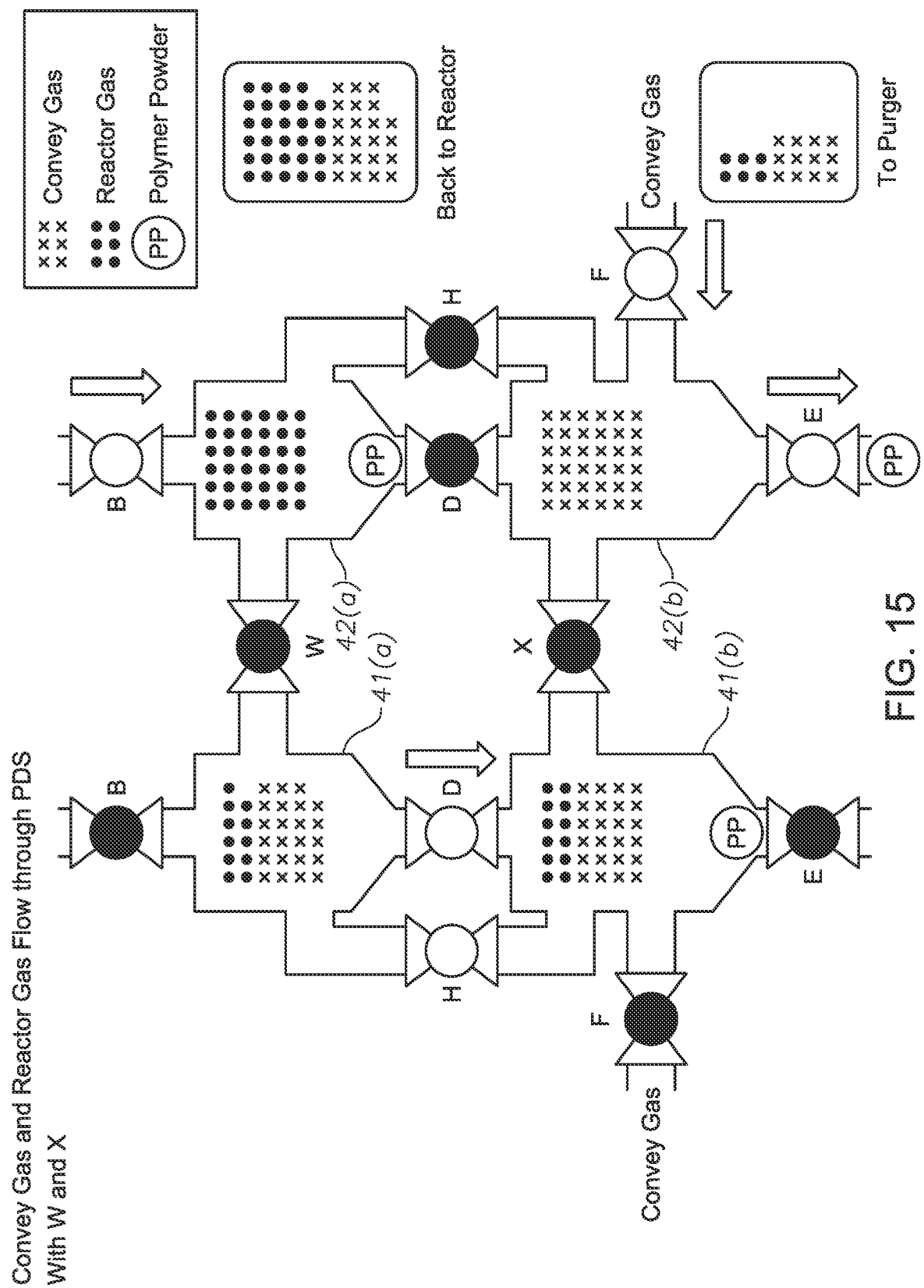

FIG. 15 shows the configuration of the product discharge system 22 at the next stage of operation after the position shown in FIG. 14, in which the positions of the various valves and the material flows are as follows:

first valves B, G, E and F remain closed and first valves D and H are opened so that the charge of polymer product in the lock hopper 41(a) passes to the lock hopper 41(b) and the gaseous contents of the lock hoppers 41(a), 41(b) are shared so that each contains 11/12 units of reactor gas and 23/24 units of conveying gas;

second valve B (and second valve G not shown) is open and a charge of polymer product and 36 units of reactor gas flow from the reactor into the lock hopper 42(a), the previous contents of the lock hopper 42(a), namely 29 units of reactor gas and 22 units of conveying gas, having been transferred to the reactor through valve G;

second valves D and H remain closed and second valves E and F are open so that the charge of polymer product previously delivered to the lock hopper 42(b), together with 6 units of reactor gas and 12 units of conveying gas, are transferred to the product recovery loop 12 and the contents of the lock hopper 42(b) are replaced with 36 units of conveying gas;

the W and X cross-ties are closed.

Figure 16:
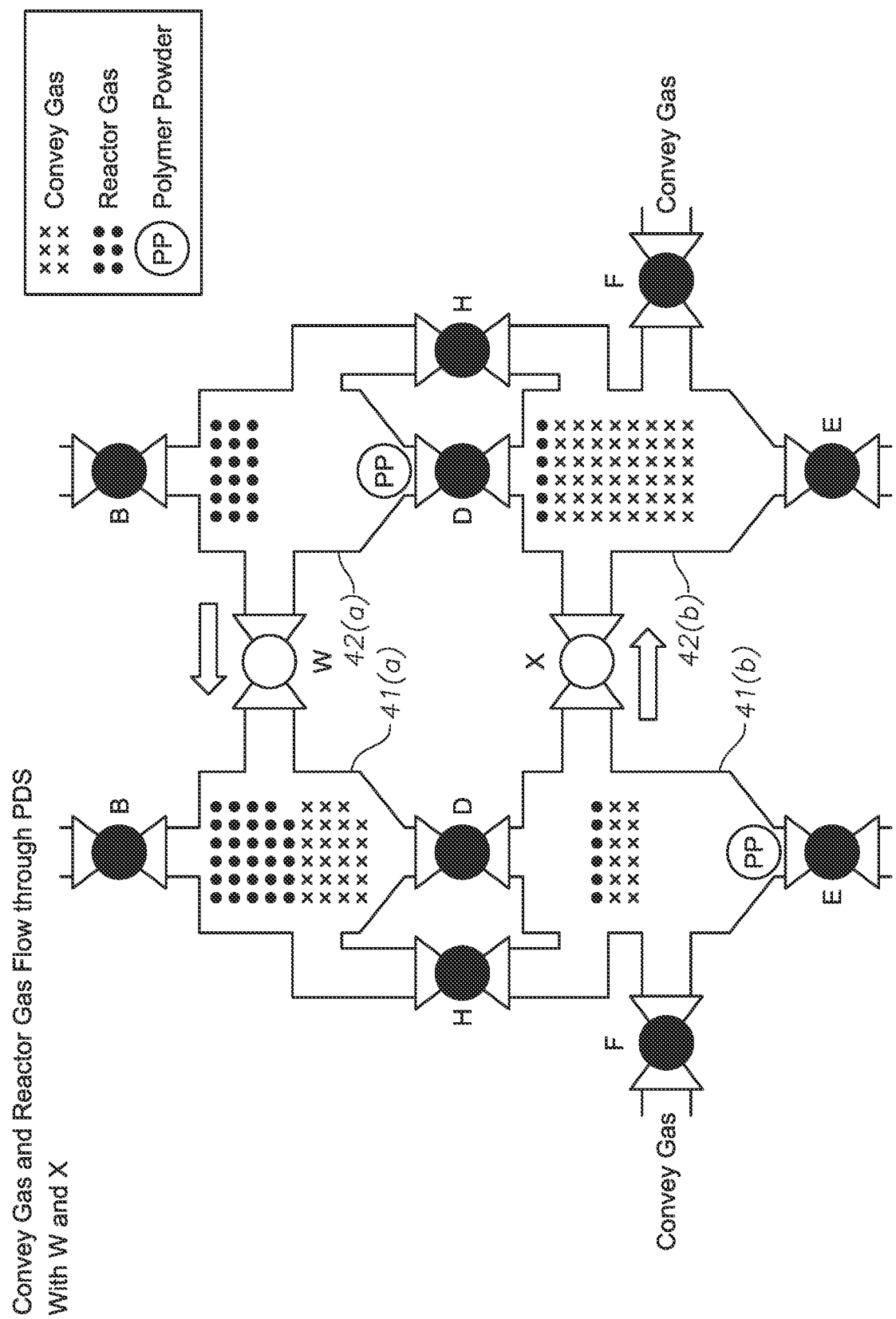

FIG. 16 shows the configuration of the product discharge system 22 at the next stage of operation after the position shown in FIG. 15, in which both cross-ties W and X are again opened while all the remaining valves are closed. As result, since the lock hopper 42(a) is at a higher pressure than the lock hopper 41(a), half of the gaseous contents of the lock hopper 42(a) are transferred via cross-tie W to lock hopper 41(a) to equilibrate the pressures. The lock hopper 41(a) then contains 29 units of reactor gas and 23 units of conveying gas, while lock hopper 42(a) contains 18 units of reactor gas. Similarly, since the lock hopper 41(b) is at a higher pressure than the lock hopper 42(b), half of the gaseous contents of the lock hopper 41(b) are transferred via cross-tie X to lock hopper 42(b) to equilibrate the pressures. The lock hopper 41(b) then contains 6 units of reactor gas and 12 units of conveying gas, while lock hopper 42(b) contains 6 units of reactor gas and 48 units of conveying gas.

Figure 17:
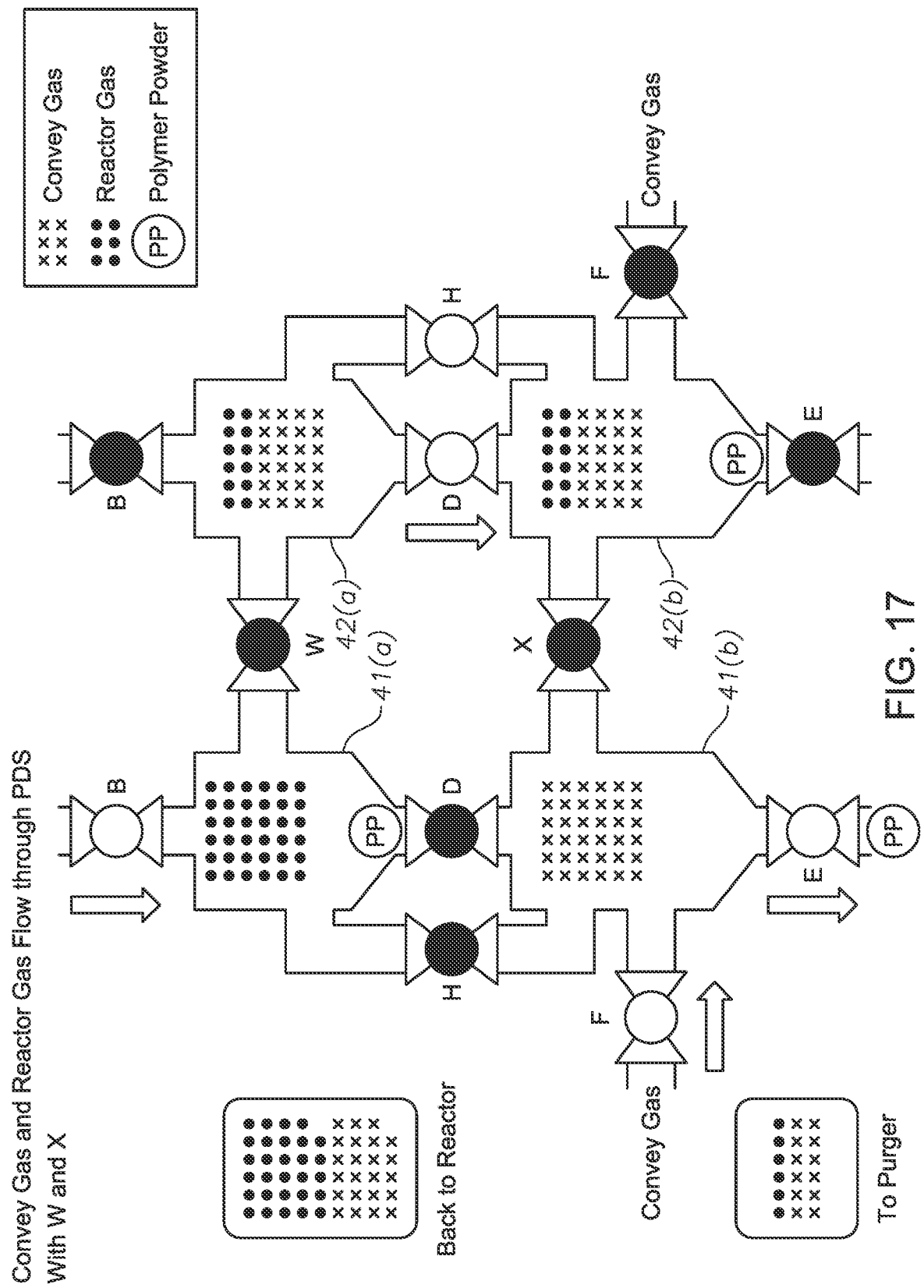

FIG. 17 shows the configuration of the product discharge system 22 at the next stage of operation after the position shown in FIG. 16, in which the positions of the various valves and the material flows are as follows:

first valve B (and first valve G not shown) is again open and lock hopper 41(a) contains a further charge of polymer product and 36 units of reactor gas, the previous contents of the lock hopper 41(a), namely 29 units of reactor gas and 23 units of conveying gas, having been transferred to the reactor through valve G;

first valves E and F are open so that a charge of polymer product previously-delivered to the lock hopper 41(b), together with 6 units of reactor gas and 12 units of conveying gas, are transported by the conveying gas to the product recovery loop 12 and the contents of the lock hopper 41(*b*) are replaced with 36 units of conveying gas;

second valves D and H are open so that a charge of polymer product previously delivered to the lock hopper 42(*a*) passes to the lock hopper 42(*b*) and the gaseous contents of the lock hoppers 42(*a*), 42(*b*) are shared so that each contains 12 units of reactor gas and 24 units of conveying gas; and the W and X cross-ties are closed.

Figure 18:
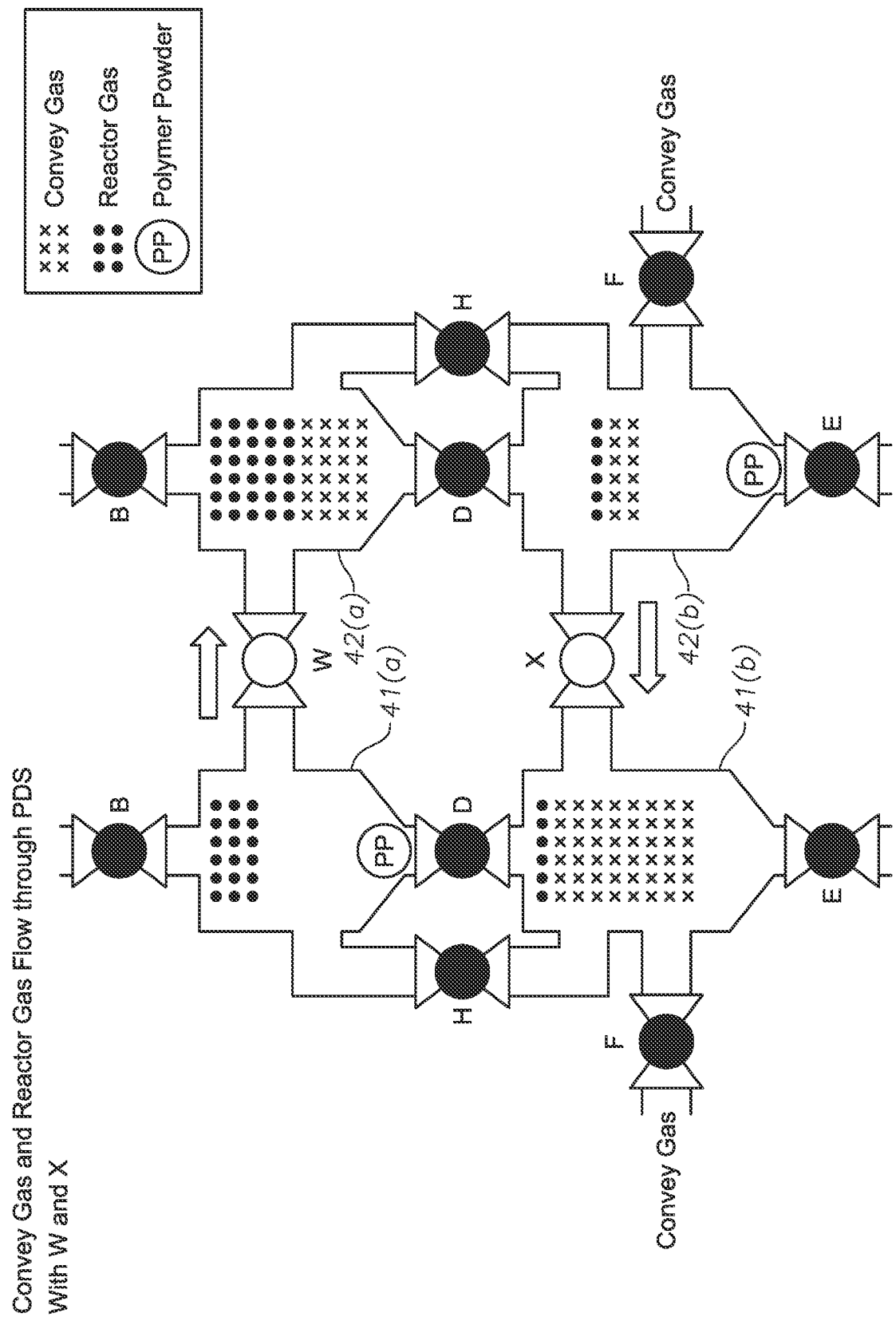

FIG. 18 shows the configuration of the product discharge system 22 at the next stage of operation after the position shown in FIG. 17, in which both cross-ties W and X are again opened while all the remaining valves are closed. As result, since the lock hopper 41(*a*) is at a higher pressure than the lock hopper 42(*a*), half of the gaseous contents of the lock hopper 41(*a*) are transferred via cross-tie W to lock hopper 42(*a*) to equilibrate the pressures. The lock hopper 41(*a*) then contains 18 units of reactor, while lock hopper 42(*a*) contains 30 units of reactor gas and 24 units of conveying gas. Similarly, since the lock hopper 42(*b*) is at a higher pressure than the lock hopper 41(*b*), half of the gaseous contents of the lock hopper 42(*b*) are transferred via cross-tie X to lock hopper 41(*b*) to equilibrate the pressures. The lock hopper 41(*b*) then contains 6 units of reactor gas and 48 units of conveying gas, while lock hopper 42(*b*) contains 6 units of reactor gas and 12 units of conveying gas.

Figure 19:
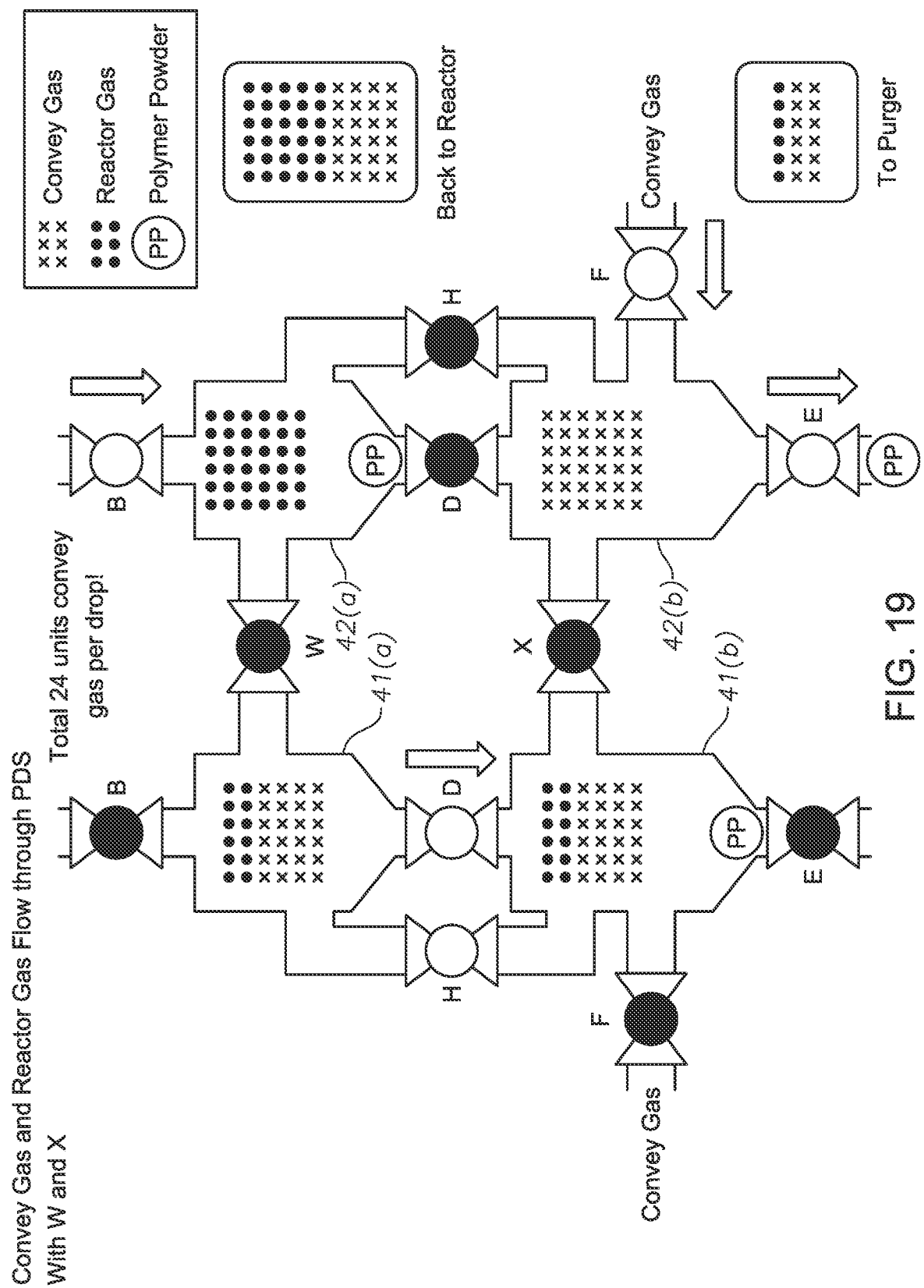

FIG. 19 shows the configuration of the product discharge system 22 at the next stage of operation after the position shown in FIG. 18, in which the positions of the various valves and the material flows are as follows:

first valves B, G, E and F remain closed and first valves D and H are opened so that the charge of polymer product in the lock hopper 41(*a*) passes to the lock hopper 41(*b*) and the gaseous contents of the lock hoppers 41(*a*), 41(*b*) are shared so that each contains 12 units of reactor gas and 24 units of conveying gas;

second valve B (and second valve G not shown) is open and a charge of polymer product and 36 units of reactor gas flow from the reactor into the lock hopper 42(*a*), the previous contents of the lock hopper 42(*a*), namely 30 units of reactor gas and 24 units of conveying gas, having been transferred to the reactor through valve G;

second valves D and H remain closed and second valves E and F are open so that the charge of polymer product previously delivered to the lock hopper 42(*b*), together with 6 units of reactor gas and 12 units of conveying gas, are transferred to the product recovery loop 12 and the contents of the lock hopper 42(*b*) are replaced with 36 units of conveying gas;

the W and X cross-ties are closed.

Summarizing the results shown in FIGS. 3 to 5, it will be seen that, when a charge of polymer product is transferred from the reactor 13 to one of the upstream lock hoppers 41(*a*), 42(*a*) without previous opening of either of the W and X cross-ties, 18 units of reactor gas and 18 units of conveying gas flow back into the reactor through valve G. Similarly, FIG. 5 also shows that the simultaneous transfer of polymer product from the corresponding downstream lock hopper 41(*b*), 42(*b*) to the product recovery loop 12 is accompanied by the flow of 18 units of reactor gas and 18 units of conveying gas to the product recovery loop 12.

As shown in FIG. 11—when the system has reached equilibrium—when a charge of polymer product is transferred from the reactor 13 to one of the upstream lock hoppers 41(*a*), 42(*a*) after previous opening of the W, but not the X, cross-tie, 27 units of reactor gas and 18 units of conveying gas flow back into the reactor through valve G. Similarly, FIG. 11 shows that the simultaneous transfer of polymer product from the corresponding downstream lock hopper 41(*b*), 42(*b*) to the product recovery loop 12—when the system has reach equilibrium—is accompanied by the flow of 9 units of reactor gas and 18 units of conveying gas to the product recovery loop 12.

In contrast, FIG. 19 shows that, again after the system has reached equilibrium, when a charge of polymer product is transferred from the reactor 13 to one of the upstream lock hoppers 41(*a*), 42(*a*) after previous opening of both of the W and X cross-ties, 30 units of reactor gas and 24 units of conveying gas flow back into the reactor through valve G. Similarly, FIG. 19 also shows that the simultaneous transfer of polymer product from the corresponding downstream lock hopper 41(*b*), 42(*b*) to the product recovery loop 12 is accompanied by the flow of 6 units of reactor gas and 12 units of conveying gas to the product recovery loop 12.

In summary, the results shown in FIGS. 3 to 19 demonstrate that some of the conveying gas used to transport polymer product from the product discharge system 22 to the product recovery loop 12 inevitably flows back into the reactor and that the amount of intrusion of conveying gas into the reactor remains the same if the W and X cross-ties remain closed, or just the W cross-tie is opened, prior to a polymer charge drop. However, if the X cross-tie is also opened before the polymer charge drop, the amount of intrusion of conveying gas into the reactor is increased.

Some gas phase polyethylene reactors of the type shown in FIGS. 1 and 2 have historically controlled pressure by increasing or decreasing the W valve utilization percentage of the product discharge system. The W cross-tie is opened after a charge of polymer product is delivered to one of the upstream lock hoppers to allow equalization in pressure with the other upstream lock hopper, thereby reducing net gas loss from the reactor during the next delivery of polymer product. Increasing the percent of deliveries during which the W valve is used decreases gas flow from the reactor. Conversely, if reactor pressure is high, the W valve utilization will decrease, increasing the rate of material removal from the reactor.

Modelling has now shown that the use of the X cross-tie inhibits the net nitrogen reduction of the reactor system as not only does it reduce gas loss from the reactor during product discharge, but also forces more nitrogen from conveying gas back into the reactor. Therefore, if there is a need to remove nitrogen from the reactor, it is more efficient to remove nitrogen from the reactor by optimizing the use of the optional X cross-tie (and increasing the amount of gas removed with the polymer product) than to vent gas from the reactor directly. This is because in addition to gas removal, optimizing the scheduled use of the X cross-tie to be used results in less nitrogen being added to the reactor by the product delivery system.

Operation of the X cross-tie is scheduled by a controller that treats the analog action of the X cross-tie as a digital control valve by sensing the pressure in the reactor; and reducing the optional operation of the X-cross-tie during removal cycles when the sensed reactor pressure exceeds a predetermined value, such as when the sensed reactor pressure exceeds 18 bar (1800 kPa-a), or exceeds 20 bar (2000 kPa-a). The controller will reduce X crosstie use by scheduling product discharge cycles to occur without the X cross-tie step. If the reactor pressure controller is calling for direct venting of reactor gas, the scheduler will call for more cycles without the X cross-tie, resulting in each cycle removing more reactor gas. The reduction of nitrogen from the product discharge system due to the decrease in X cross-tie use will hasten the pressure change and prevent the need for direct reactor venting. This results in a net reduction of gas venting from the reactor.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A process for producing an olefin polymer, the process comprising:
   (a) providing a gas phase polymerization reactor having a product discharge system comprising first and second pairs of lock hoppers, wherein each pair comprises an upstream lock hopper connected by valve means to the reactor and a downstream lock hopper connected by valve means to the upstream lock hopper and by further valve means to a product recovery system, and wherein a first cross-tie is provided between the upstream lock hoppers of the first and second pairs of lock hoppers and a second cross-tie is provided between the downstream lock hoppers of the first and second pairs of lock hoppers;
   (b) supplying a particulate catalyst and a carrier gas to the polymerization reactor such that the particulate catalyst is maintained in a fluidized state by the carrier gas;
   (c) supplying at least one olefin monomer to the fluidized catalyst in the reactor under conditions effective to polymerize the monomer and produce a polymer product;
   (d) removing the polymer product and a reactor gas comprising at least a portion of the carrier gas from the reactor through the first and second pairs of lock hoppers in cycles,
   wherein each removal cycle (d) includes the steps of:
      (i) transferring polymer product and reactor gas from the reactor to the upstream lock hopper of the first pair of lock hoppers and equilibrating the pressure between the reactor and said upstream lock hopper;
      (ii) while performing (i), transferring polymer product and reactor gas from the upstream to the downstream lock hopper of the second pair of lock hoppers and equilibrating the pressure therebetween;
      (iii) while performing (i) and (ii), transferring polymer product using a conveying gas from the downstream lock hopper of the first pair of lock hoppers to the product recovery system;
      (iv) after performing (i), (ii), and (iii), passing reactor gas from the upstream lock hopper of the first pair of lock hoppers to the upstream lock hopper of the second pair of lock hoppers via the first cross-tie to equilibrate the pressure between the upstream lock hoppers; and
   further wherein some, but not all, of the removal cycles (d) further include the step of:
      (v) passing reactor gas and conveying gas from the downstream lock hopper of the first pair of lock hoppers to the downstream lock hopper of the second pair of lock hoppers via the second cross-tie to equilibrate the pressure between the downstream lock hoppers;
   further wherein during steps (i), (ii), (iii), (iv), and (v) each lock hopper is isolated by closed valves from any of the reactor, the other lock hoppers and the product recovery system not necessary for the performance of the respective step;
   (e) sensing the pressure in the reactor; and
   (f) adjusting the frequency of step (v) during successive removal cycles in accordance with the reactor pressure sensed in (e).

2. The process of claim 1, wherein the at least one olefin monomer comprises ethylene.

3. The process of claim 1, wherein the at least one olefin monomer comprises ethylene and at least one of propylene and a $C_4$ to $C_8$ alpha-olefin.

4. The process of claim 1, wherein the polymerizing (a) is conducted under conditions such that the at least one olefin monomer is in the gas phase.

5. The process of claim 1, wherein the polymerizing (a) is conducted under conditions including a temperature of 70 to 110° C. and a pressure of 15 to 30 bar (1500 to 3000 kPa-a).

6. The process of claim 1, wherein the carrier gas comprises nitrogen.

7. The process of claim 1, wherein the conveying gas comprises nitrogen.

8. The process of claim 1, wherein the conveying gas comprises nitrogen and ethylene.

9. The process of claim 1, wherein the frequency of step (v) during successive removal cycles is reduced when the reactor pressure sensed in (e) exceeds a predetermined value.

10. The process of claim 1, wherein the frequency of step (v) during successive removal cycles is reduced when the reactor pressure sensed in (e) exceeds 18 bar (1800 kPa-a).

11. The process of claim 1, wherein the frequency of step (v) during successive removal cycles is reduced when the reactor pressure sensed in (e) exceeds 20 bar (2000 kPa-a).

12. The process of claim 1, wherein the adjusting (f) is effected by a controller which controls operation of the second cross-tie in response to the pressure sensed in (e).

13. The process of claim 12, wherein the controller is configured to reduce the frequency of step (v) when the reactor pressure sensed in (e) indicates a need for direct venting of reactor gas from the reactor.

* * * * *